US012574163B2

(12) United States Patent
Baek et al.

(10) Patent No.: US 12,574,163 B2
(45) Date of Patent: Mar. 10, 2026

(54) SPS OPERATION METHOD AND DEVICE FOR MBS RECEPTION

(71) Applicant: Samsung Electronics Co., Ltd., Suwon-si (KR)

(72) Inventors: Sangkyu Baek, Suwon-si (KR); Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 18/015,629

(22) PCT Filed: Jul. 12, 2021

(86) PCT No.: PCT/KR2021/008899
§ 371 (c)(1),
(2) Date: Jan. 11, 2023

(87) PCT Pub. No.: WO2022/014992
PCT Pub. Date: Jan. 20, 2022

(65) Prior Publication Data
US 2023/0299890 A1     Sep. 21, 2023

(30) Foreign Application Priority Data

| Jul. 13, 2020 | (KR) | ..................... | 10-2020-0086450 |
| May 7, 2021 | (KR) | ..................... | 10-2021-0059508 |
| Jul. 9, 2021 | (KR) | ..................... | 10-2021-0090486 |

(51) Int. Cl.
*H04W 4/00* (2018.01)
*H04L 1/1822* (2023.01)
(Continued)

(52) U.S. Cl.
CPC .......... *H04L 1/1822* (2013.01); *H04L 1/1864* (2013.01); *H04W 72/11* (2023.01); *H04W 72/30* (2023.01)

(58) Field of Classification Search
CPC . H04W 72/1263; H04W 72/11; H04W 72/30; H04W 72/04; H04W 72/12;
(Continued)

(56) References Cited

U.S. PATENT DOCUMENTS

| 10,966,277 B1 * | 3/2021 | Shukla | .................. | H04W 12/12 |
| 2013/0201884 A1 * | 8/2013 | Freda | .................... | H04L 5/0055 |
| | | | | 370/278 |

(Continued)

FOREIGN PATENT DOCUMENTS

| KR | 10-2019-0124334 A | 11/2019 |
| KR | 10-2020-0035257 A | 4/2020 |

(Continued)

OTHER PUBLICATIONS

Ericsson, Introducing SPS for NB-IOT SC-PtM, Tdoc R2-1808222, XP05144451, 3GPP TSG-RAN WG2 #102, Busan, Republic of Korea, May 20, 2018.

(Continued)

*Primary Examiner* — Shantell L Heiber
(74) *Attorney, Agent, or Firm* — Jefferson IP Law, LLP

(57) ABSTRACT

The disclosure provides a semi-persistent scheduling (SPS) operation method for multicast and broadcast service (MBS) reception by a user equipment (UE), the operation method including: receiving a message indicating configuration and activation of MBS SPS from a base station (BS); storing resource allocation information and hybrid automatic request (HARQ) information for the MBS SPS in a media access control (MAC) layer; initializing or re-initializing a resource configured for the MBS SPS in the MAC layer; and (Continued)

transmitting, to the BS, confirmation message of the activation and configuration of the MBS SPS.

7 Claims, 15 Drawing Sheets

(51) Int. Cl.
*H04L 1/1829* (2023.01)
*H04W 72/11* (2023.01)
*H04W 72/30* (2023.01)

(58) Field of Classification Search
CPC ..... H04W 72/50; H04W 4/06; H04W 72/231; H04L 1/1864; H04L 1/1887; H04J 2203/0069
See application file for complete search history.

(56) References Cited

U.S. PATENT DOCUMENTS

| | | | | |
|---|---|---|---|---|
| 2018/0026803 | A1* | 1/2018 | Fujishiro | H04W 72/1273 370/312 |
| 2018/0092122 | A1* | 3/2018 | Babaei | H04L 1/1822 |
| 2018/0279274 | A1* | 9/2018 | Sun | H04W 52/50 |
| 2019/0245657 | A1 | 8/2019 | Lee et al. | |
| 2019/0281418 | A1 | 9/2019 | Chen et al. | |
| 2020/0068595 | A1 | 2/2020 | Dinan et al. | |
| 2020/0128572 | A1* | 4/2020 | Dinan | H04W 4/70 |
| 2020/0163061 | A1 | 5/2020 | Tang | |
| 2020/0280872 | A1* | 9/2020 | Fiorani | H04W 28/24 |
| 2021/0160879 | A1* | 5/2021 | Lin | H04W 72/0453 |
| 2021/0344448 | A1* | 11/2021 | Nogami | H04L 1/1887 |
| 2022/0149997 | A1* | 5/2022 | Wang | H04L 1/1822 |

FOREIGN PATENT DOCUMENTS

| | | | |
|---|---|---|---|
| KR | 10-2021-0102802 | A | 8/2021 |
| KR | 10-2021-0115470 | A | 9/2021 |
| KR | 10-2021-0120391 | A | 10/2021 |

OTHER PUBLICATIONS

Extended European Search Report dated Oct. 12, 2023, issued in European Patent Application No. 21842445.5.

Ericsson, Introducing SPS for NB-IoT SC-PtM, Tdoc R2-1808222, XP051444514, 3GPP TSG-RAN WG2 #102, Busan, Republic of Korea, May 20, 2018.

European Notice of Allowance dated Nov. 25, 2025, issued in European Patent Application No. 21842445.5.

* cited by examiner

210

BS

220

UE

230

RESELECT CELL

RECEIVE SYSTEM INFORMATION — 235

IDENTIFY MBS SERVICE OF INTEREST — 240

ACCESS CONTROL — 245

REQUEST RRC SETUP — 250

RRC Setup — 260

COMPLETE RRC SETUP — 265

RRC RECONFIGURATION — 270

COMPLETE RRC RECONFIGURATION — 275

280

PERFORM MBS COMMUNICATION 1810     1820

1910  1920     1930

2010     2020

SPS OPERATION METHOD AND DEVICE FOR MBS RECEPTION

TECHNICAL FIELD

The disclosure relates to a semi-persistent scheduling (SPS) operation method and device for multicast and broadcast service (MBS) reception in a wireless communication system.

BACKGROUND ART

To meet the ever-increasing demand with respect to wireless data traffic since the commercialization of the 4G communication system, there have been efforts to develop an advanced fifth generation (5G) system or pre-5G communication system. For this reason, the 5G or pre-5G communication system is also called a beyond 4th-generation (4G) network communication system or post long-term evolution (LTE) system. Implementation of the 5G communication system using ultra-frequency (mmWave: millimeter wave) bands, e.g., 60 GHz (80 GHz) bands is considered to achieve higher data rates. To reduce propagation loss of radio waves and increase a transmission range of radio waves in the ultrahigh frequency bands, beamforming, massive multiple-input multiple-output (MIMO), full dimensional MIMO (FD-MIMO), array antenna, analog beamforming, and large-scale antenna techniques are under discussion. To improve system networks, technologies for advanced small cells, cloud radio access networks (RANs), ultra-dense networks, device to device (D2D) communication, wireless backhaul, moving networks, cooperative communication, coordinated multi-points (COMP), reception-end interference cancellation and the like are also being developed in the 5G communication system. In addition, in the 5G system, an advanced coding modulation (ACM), e.g., hybrid FSK and QAM modulation (FQAM), sliding window superposition coding (SWSC), and an advanced access technology, e.g., filter bank multi carrier (FBMC), non-orthogonal multiple access (NOMA), and sparse code multiple access (SCMA) are being developed.

In the meantime, the Internet is evolving from a human-oriented connectivity network where humans generate and consume information to an Internet of things (IoT) network where distributed entities or things send, receive and process information without human intervention. Internet of Everything (IoE) technologies, in which a big data processing technology through connection with a cloud server, for example, are combined with an IoT technology, have also emerged. To implement IoT, various technologies, such as a sensing technology, a wired/wireless communication and network infrastructure, a service interfacing technology, and a security technology are required, and even technologies for sensor networks, machine to machine (M2M) communication, machine type communication (MTC) for connection between things are being studied these days. In the IoT environment, intelligent Internet technology (IT) services that create new values for human life by collecting and analyzing data generated from connected things may be provided. IoT may be applied to a variety of areas, such as smart homes, smart buildings, smart cities, smart cars or connected cars, smart grids, health care, smart home appliances and advanced medical services through convergence and combination between existing information technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even application of a cloud radio access network (cloud RAN) as the aforementioned big data processing technology may be viewed as an example of convergence of 5G and IoT technologies.

As various services can be provided with the advancement of the aforementioned and wireless communication systems, a scheme for using a semi-persistent scheduling (SPS) for periodic broadcast services is required to efficiently use a physical downlink control channel (PDCCH) resource in particular.

DISCLOSURE

Technical Problem

Embodiments of the disclosure provide a device and method for effectively using resources in wireless communication system.

Technical Solution

According to an embodiment of the disclosure, a semi-persistent scheduling (SPS) operation method for multicast and broadcast service (MBS) reception by a user equipment (UE) includes: receiving a message indicating configuration and activation of MBS SPS from a base station (BS); storing resource allocation information and hybrid automatic request (HARQ) information for the MBS SPS in a media access control (MAC) layer; initializing or re-initializing a resource configured for the MBS SPS in the MAC layer; and transmitting, to the BS, a confirmation message of the activation and configuration of the MBS SPS.

Advantageous Effects

According to an embodiment of the disclosure, resources may be efficiently used in a wireless communication system.

BEST MODE

Figure 1:
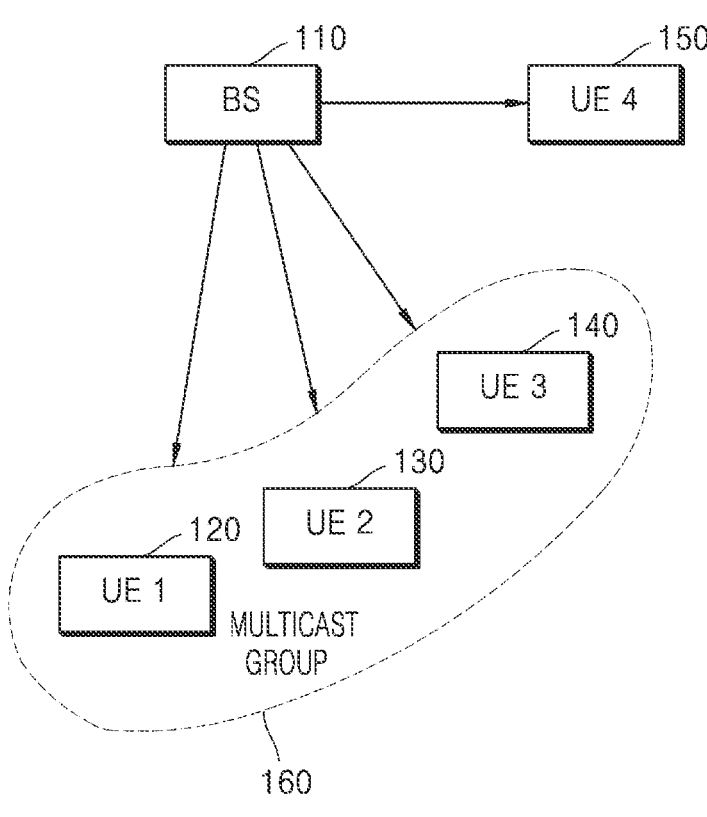
FIG. 1 illustrates an operation method of multicast and broadcast service (MBS) communication, according to an embodiment of the disclosure.

According to an aspect of the disclosure, a method by which a user equipment (UE) operates in a wireless communication system is provided. The method includes receiving, from a base station (BS), a message indicating activation of multicast and broadcast service (MBS) semi-persistent scheduling (SPS); storing resource allocation information for the MBS SPS and hybrid automatic repeat request (HARQ) information associated with the resource allocation information in a medium access control (MAC) layer entity of the UE; and initializing or re-initializing a resource configured for the MBS SPS in the MAC layer entity.

In an embodiment of the disclosure, the method may further include receiving MBS SPS configuration information included in downlink bandwidth part (BWP) configuration information.

In an embodiment of the disclosure, the MBS SPS configuration information may include at least one of a group-configured scheduling-transmission radio network temporary identifier (G-CS-RNTI) value used for MBS SPS, a number of HARQ processes used (nofHARQ-Processes), an offset of an HARQ process (harq-ProcID-Offset), a period of MBS SPS, an identifier for identifying MBS SPS, and a classifier indicating whether SPS corresponding to the MBS SPS configuration information is MBS SPS or unicast service SPS.

In an embodiment of the disclosure, the method may further include receiving, from the BS, MBS SPS configuration information included in a radio resource control (RRC) message or system information block, and in an embodiment of the disclosure, the MBS SPS configuration information may include at least one of a G-CS-RNTI value used for MBS SPS, a number of HARQ processes used (nofHARQ-Processes), an offset of an HARQ process (harq-ProcID-Offset), a period of MBS SPS, an identifier for identifying a cell for which MBS SPS is configured, and an identifier for identifying a BWP for which MBS SPS is configured.

In an embodiment of the disclosure, the receiving of the message indicating deactivation of the MBS SPS may include receiving an MBS SPS activation message by using a physical downlink control channel (PDCCH) resource allocated with a G-CS-RNTI, and a new data indicator (NDI) value included in the MBS SPS activation message may be set to 0.

In an embodiment of the disclosure, the method may further include transmitting, to the BS, a confirmation message of MBS SPS activation, and the confirmation message of the MBS SPS activation may be transmitted in the form of a medium access control (MAC) control element (CE) or in the form of uplink control information (UCI) of a physical uplink control channel (PUCCH).

In an embodiment of the disclosure, the method may further include receiving, from the BS, a message indicating deactivation of the MBS SPS; deleting resource allocation information for MBS SPS and HARQ information associated with the resource allocation information in the MAC layer entity of the UE; and transmitting, to the BS, a confirmation message of deactivation of the MBS SPS.

In an embodiment of the disclosure, the method may further include switching the UE in an idle mode or inactive mode into a connected mode when receiving a message indicating deactivation of the MBS SPS.

In an embodiment of the disclosure, the method may further include receiving, from the BS, a retransmission resource of the MBS SPS resource; determining whether data of a transport block (TB) for an HARQ process has been successfully decoded; discarding the retransmission resource when the data of the TB has been successfully decoded; and transmitting HARQ information associated with the retransmission resource to an HARQ device of the UE when the data of the TB has not been successfully decoded.

In an embodiment of the disclosure, the retransmission resource of the MBS SPS resource is received using a PDCCH resource allocated with a G-CS-RNTI, and an NDI value included in the retransmission resource of the MBS SPS resource is set to 1.

According to another aspect of the disclosure, a user equipment (UE) operating in a wireless communication system includes a communicator; and at least one processor configured to operate while connected to the communicator, wherein the at least one processor may receive, from a base station (BS), a message indicating configuration and activation of multicast and broadcast service (MBS) semi-persistent scheduling (SPS), store resource allocation information for the MBS SPS and hybrid automatic repeat request (HARQ) information associated with the resource allocation information, and initialize or reinitialize a resource configured for the MBS SPS.

In an embodiment of the disclosure, the at least one processor may receive, from the BS, a message indicating deactivation of MBS SPS, delete resource allocation information for MBS SPS and HARQ information associated with the resource allocation information in a MAC layer entity of the UE, and transmit, to the BS, a confirmation message of deactivation of the MBS SPS.

In an embodiment of the disclosure, the at least one processor may receive, from the BS, a retransmission resource of the MBS SPS resource, determine whether data of a TB for an HARQ process has been successfully decoded, discard the retransmission resource when the data of the TB has been successfully decoded, and transmit HARQ information associated with the retransmission resource to an HARQ device of the UE when the data of the TB has not been successfully decoded.

In another aspect of the disclosure, a base station (BS) operating in a wireless communication system includes a communicator; and at least one processor configured to operate while connected to the communicator, wherein the at least one processor may transmit, to a user equipment (UE), a message indicating configuration and activation of multicast and broadcast service (MBS) semi-persistent scheduling (SPS), store resource allocation information for the MBS SPS and hybrid automatic repeat request (HARQ) information associated with the resource allocation information, and transmit, to the UE, data by using an MBS SPS resource.

MODE FOR INVENTION

Descriptions of some well-known technologies that possibly obscure the disclosure will be omitted, if necessary. Further, the terms, as will be mentioned later, are defined by taking functionalities in the disclosure into account, but may vary depending on practices or intentions of users or operators. Accordingly, the terms should be defined based on descriptions throughout this specification. Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the following description, a base station is an entity for performing resource allocation for a terminal, and may be at least one of a gNB, an eNB, a Node B, a base station (BS), a radio access unit, a base station controller, or a network node. The terminal may include a user equipment (UE), a mobile station (MS), a cellular phone, a smart phone, a computer, or a multimedia system capable of performing a communication function. Furthermore, the term 'terminal' or 'user equipment (UE)' may refer not only to a cell phone, an NB-IoT device, and a sensor but also to other wireless communication devices. The base station and the terminal are, of course, not limited thereto.

For convenience of explanation, the disclosure will hereinafter use terms and definitions defined by the third generation partnership project (3GPP) long term evolution (LTE) standard and/or third generation partnership project new radio (NR). The disclosure is not, however, limited to the terms and definitions.

Although the following embodiments of the disclosure will now be focused on an LTE, LTE-A, LTE Pro or 5G (or NR, next generation mobile communication) system for example, they may be equally applied to other communication systems with similar technical backgrounds or channel types. Furthermore, embodiments of the disclosure will also be applied to different communication systems with some modifications to such an extent that they do not significantly deviate from the scope of the disclosure when judged by those of ordinary skill in the art. Embodiments of the disclosure will now be described with reference to accompanying drawings.

FIG. 1 illustrates an operation method of multicast and broadcast service (MBS) communication, according to an embodiment of the disclosure. MBS communication refers to a method in which one transmission device communicates with multiple reception devices in a wireless communication system. The transmission device may be a BS, and each reception device may be a UE. It is not, however, limited thereto, and the transmission device may be a UE.

In the embodiment of FIG. 1, illustrated is MBS communication performed in a case that a BS 110 is a transmission device and UEs 120, 130, 140 and 150 are reception devices. The MBS communication may be performed in a broadcast method for many unspecified entities or may be performed in a multicast method for many specified reception devices. When multicast communication is performed, the BS may configure only a particular UE to receive a corresponding multicast packet. For this, a set of UEs to perform certain multicast communication may be configured, which is referred to as a multicast group 160 in the embodiment of FIG. 1. On the contrary, a method in which a BS and a UE communicate one to one is called unicast.

The UEs in the multicast group may be allocated the same group radio network temporary identity (G-RNTI) for each multicast group and may receive data allocated for the G-RNTI. The G-RNTI is an RNTI shared by the UEs in the multicast group, and the UEs that have received the G-RNTI may receive a radio resource for an MBS service from the BS. In the embodiment of FIG. 1, it is assumed that UE 1 120, UE 2 130 and UE 3 140 are configured to be in a multicast group and allocated a G-RNTI to receive data from a BS 110 in multicast. UE 4 150 is not included in the multicast group and thus is not allocated the G-RNTI, so the UE 4 cannot receive data that the UE 1 120, UE 2 130 and UE 3 140 receive from the BS.

There may be one or more multicast groups set up in the coverage of the BS 110, and the multicast groups may be distinguished by the respective G-RNTIs. One UE may be allocated one or more G-RNTIs from the BS 110. The UE may receive multicast data using the G-RNTI value allocated in the connected mode not only in the connected mode (radio resource control (RRC) connected mode) but also in an idle mode (RRC IDLE mode) or inactive mode (RRC INACTIVE mode). The G-RNTI may be included in at least one of an RRC reconfiguration message, an RRC setup message or an RRC reestablishment message in the connected mode of the UE. It is not, however, limited thereto, and the G-RNTI may be included in a system information block (SIB) as a G-RNTI value to be received by the UE and transmitted from the BS in the SIB. The UE configured with the G-RNTI value may use the G-RNTI value afterward.

Figure 2:
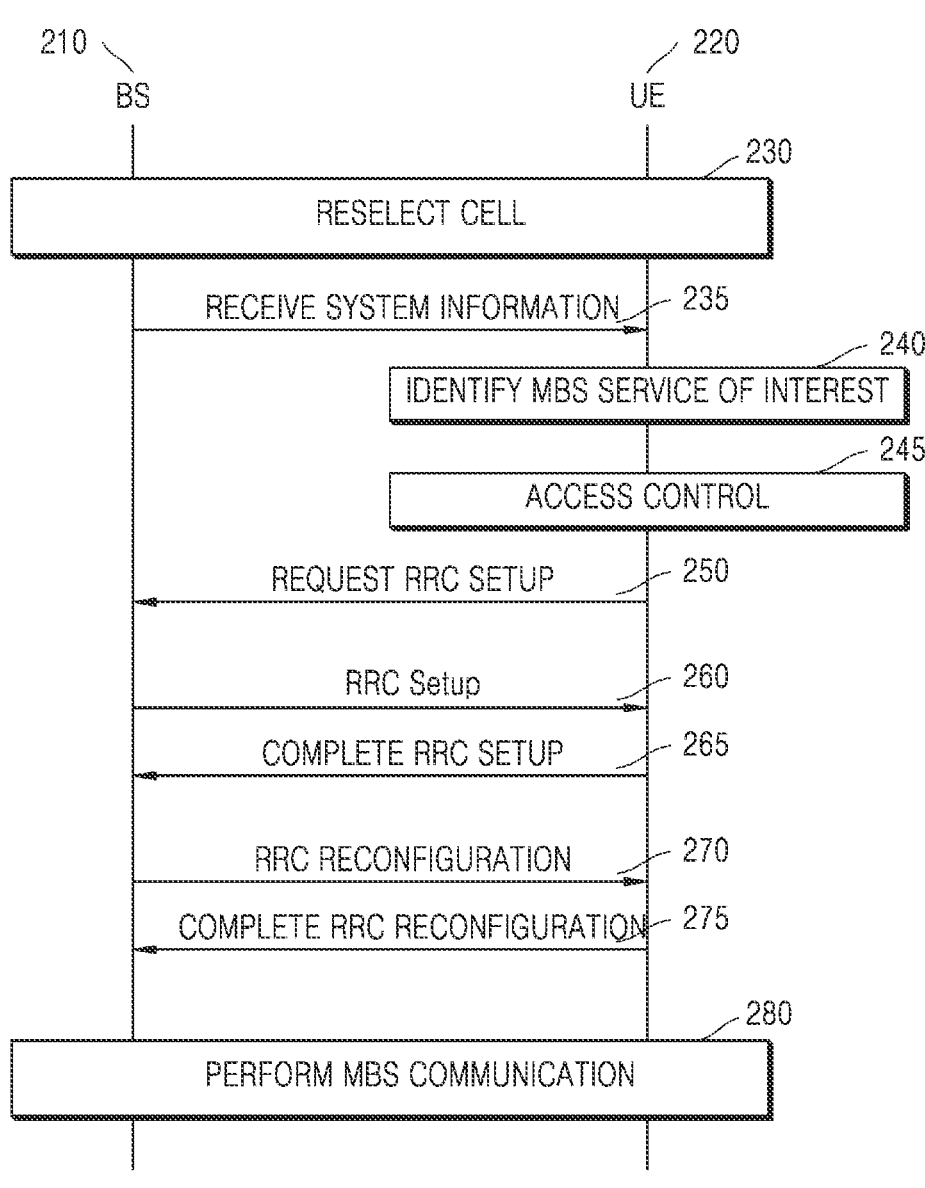
FIG. 2 illustrates a setup procedure for performing MBS communication, according to an embodiment of the disclosure.

FIG. 2 illustrates a setup procedure for performing MBS communication, according to an embodiment of the disclosure. A UE 220 for which RRC connection is not established with a BS 210 may select a BS from which to request an MBS service to perform MBS communication. In operation 230, the UE 220 may receive synchronization signals transmitted from BSs and perform a cell selection or cell reselection procedure for selecting a BS from which a strong signal is received. In the embodiment of FIG. 2, it is assumed that the UE switched into an idle mode or inactive mode after an initially connected state performs a cell reselection operation to select a cell.

In operation 235, the UE 220 may receive an SIB from the selected cell. In this case, when the UE 220 wants to receive an MBS service, it may receive one of SIBs which includes MBS information. In the SIB including the MBS information, a list of MBS services that are being already provided or may be provided in each serving cell may be included.

The list of MBS services that are being already provided or may be provided in each serving cell may be denoted AvailableMBSList. AvailableMBSList may include a plurality of pieces of MBS session information. The MBS session information may include a temporary mobile group identity (tmgi) value to identify a group and an MBS session ID (sessionID). The tmgi value may include a public land mobile network (PMNM) id (plmn-id) to identify a service provided by a communication operator and a service ID (serviceID) to identify a service provided by the communication operator. In an embodiment of the disclosure, AvailableMBSList may have a structure as in the following example.

AvailableMBSList=MBSSessionInfoList
MBSSessionInfoList=sequence of (tmgi, sessionID)
tmgi=(plmn-id, serviceID)

When all the UEs request RRC configuration to receive all MBS services, the BS may be overloaded because the BS may be instantaneously connected to many UEs. Accordingly, an access control method for MBS services may be required. For this, for each tmgi, an access category value and uac-BarringForAccessIdentity may be configured for access control. The BS may control the frequency of the UE requesting access to the BS for each tmgi by using the access category and uac-BarringForAccessIdentity configured for each tmgi. Although it is assumed in the embodiment of FIG. 2 that the UE 220 receives an SIB including MBS information, the disclosure is not limited to the embodiment of FIG. 2 and the MBS information may be transmitted in a DL information transfer message in various embodiments of the disclosure.

The UE 220 that receives an SIB including the MBS information in operation 235 may identify an MBS service of interest in the list of MBS services that are already being provided or may be provided in each serving cell, in operation 240. The UE 220 may determine whether an MBS service is required by an application of the UE 220 or otherwise, which MBS service interests the UE 220 according to other conditions. A criterion for the UE 220 to identify an MBS service may be a unit of tmgi. In other words, the UE 220 may determine whether a tmgi of an MBS service that the UE 220 intends to receive (or that the UE 220 is interested in) is included in an SIB including the MBS information. Specifically, the UE 220 may determine whether a tmgi of an MBS service that the UE 220 intends to receive is included in AvailableMBSList of the SIB including the MBS information. When the tmgi of the MBS service that the UE 220 intends to receive is included in the SIB including the MBS information, the UE 220 may perform establishing RRC connection to receive the MBS service.

In operation 245, the UE 220 may perform an access control operation to determine whether to initiate RRC connection setup. Based on a PLMN ID (plmn-ID) included in the tmgi of the MBS service that the UE 220 intends to receive, access control may be performed using UAC-Barring information for the PLMN ID. The UE 220 may determine whether access to an access c category and uac-BarringForAccessIdentity of the MBS service that the UE 220 wants to receive is granted. When the access to the MBS service is granted, the UE 220 may start a procedure for requesting RRC connection.

When the access for the UE 220 to receive the MBS service is granted, the UE 220 may transmit an RRC setup request message to the BS 210 in operation 250. The disclosure is not, however, limited to the UE 220 transmitting the RRC setup request message, and an RRC reestablishment request message may also be used for the same purpose with the RRC setup request message. The RRC setup request message or the RRC reestablishment request message is a common message that may be used for the UE 220 to be switched into a connected mode (RRC connected mode), and may thus include a cause value about why the UE 220 wants to switch into the connected mode. To receive an MBS service, the UE 220 may transmit, to the BS 210, the RRC setup request or RRC reestablishment request message including the cause value indicating that MBS configuration is wanted. However, when the RRC setup request or RRC reestablishment request is not to receive an MBS service, the UE 220 may transmit an RRC setup request or RRC reestablishment request message including a cause value sent from a higher layer. For example, the cause value sent from the higher layer may include information relating to a non-access stratum (NAS) layer. In operation 260, the BS 210 may transmit an RRC setup message to the UE 220 to switch the UE 220 into the connected mode. The disclosure is not, however, limited to the BS 210 transmitting the RRC setup message, and an RRC reestablishment message may also be used for the same purpose with the RRC setup message. When the UE 220 receives the RRC setup message or the RRC reestablishment message, signaling radio bearer 1 (SRB1) may be configured by configuration information of the SRB1 included in the received message. The SRB1 may be a radio bearer for exchanging RRC messages between the BS 210 and the UE 220.

In operation 265, the UE 220 may notify that the configuration received from the BS 210 is successfully applied by applying the configuration information included in the RRC setup message or RRC reestablishment message and transmitting an RRC setup complete message or RRC reestablishment complete message to the BS 210. Furthermore, the RRC setup complete message or RRC reestablishment complete message transmitted in operation 265 may include a list of MBS services that the UE 220 intends to receive. The MBS service list included in the RRC setup complete message or RRC reestablishment complete message may be a list including tmgi values corresponding to the MBS services that the UE 220 intends to receive. In this case, tmgis included in the MBS service list may be all or some of tmgis included in the list of MBS services that are already being provided or may be provided in each serving cell, which is included in the SIB or DL information transfer message transmitted in operation 235.

In operation 270, the BS 210 may transmit an RRC reconfiguration message to the UE 220. As the SRB1 is configured and the list of MBS services that the UE 220 intends to receive is sent to the BS 210 in operation 265, the BS 210 may configure the UE 220 to receive the MBS service based on the configured SRB1 and the list of MBS services. The MBS service configured by the BS 210 to be received by the UE 220 may be configured using the RRC reconfiguration message transmitted by the BS 210 to the UE 220. The RRC reconfiguration message may include signaling radio bearer 2 (SRB2) used for transmission or reception of the NAS message, a data radio bearer (DRB) used for transmission or reception of data, and point to multipoint (PTM) DRB configuration information to be used for multicast transmission. The PTM DRB may be configured without distinction from a common DRB, or may be configured by a received G-RNTI. Furthermore, based on the RRC reconfiguration message, a radio link control (RLC) bearer in which the configured radio bearer is transmitted may be configured and what radio bearer is to be connected to the RLC bearer may be configured. In the RRC reconfiguration message, a G-RNTI may be configured for the UEs belonging to the multicast group to receive multicast data.

The G-RNTI is an RNTI configured for reception of a TB, and may be used to represent scheduling information for a physical downlink shared channel (PDSCH). The G-RNTI may be configured for each MAC layer entity or for each BWP. When a G-RNTI is configured for each BWP, the G-RNTI may be used only to receive a PDSCH resource of the BWP. In other words, the G-RNTI may not be used in other BWPs. For this, the G-RNTI may be included in a DL BWP configuration (BWP-downlink configuration) field of an RRC message (e.g., at least one of RRC reconfiguration message, RRC setup message or RRC reestablishment message). Furthermore, when the G-RNTI is configured, a BWP ID to be used may be configured as well. In another embodiment, the G-RNTI may be configured for each cell. When the G-RNTI is configured for each cell, the G-RNTI may be used only to receive a PDSCH resource of the cell. In other words, the G-RNTI may not be used in other cells. For this, the G-RNTI may be included in a cell configuration field of the RRC message. Furthermore, when the G-RNTI is configured, a cell ID to be used may be configured as well.

For reception of the MBS service, a BWP and a search space may be separately configured. Information about a BWP and a search space for receiving a certain MBS service may be configured by the BS 210 for the UE 220, and this configuration information may include an MBS BWP and an MBS search space. The MBS BWP may refer to a BWP to which an allocated G-RNTI is applied. In an embodiment, a BWP for which a G-RNTI is included in the BWP-downlink configuration field may be the MBS BWP. The MBS search space may be a search space with search space configuration information in which a downlink control information (DCI) format for MBS reception is configured, or a search space with search space configuration information including an indicator indicating the search space for MBS reception. For example, the search space configuration information may include a 1-bit indicator indicating whether the search space is an MBS search space. When an indicator in the search space configuration information indicates the MBS search space, the search space may be the MBS search space and may be used for monitoring a G-RNTI for MBS reception.

When the UE applies content in the RRC reconfiguration message transmitted from the BS 210 to the UE 220 in operation 270, the UE 220 may notify that it applies the information of the RRC reconfiguration message by transmitting an RRC reconfiguration complete message to the BS 210 in operation 275. Based on the RRC reconfiguration complete message, the UE 220 may perform MBS communication in operation 280 to receive a broadcast or multicast packet. The UE 220 may receive an MBS service from the BS.

Figure 3:
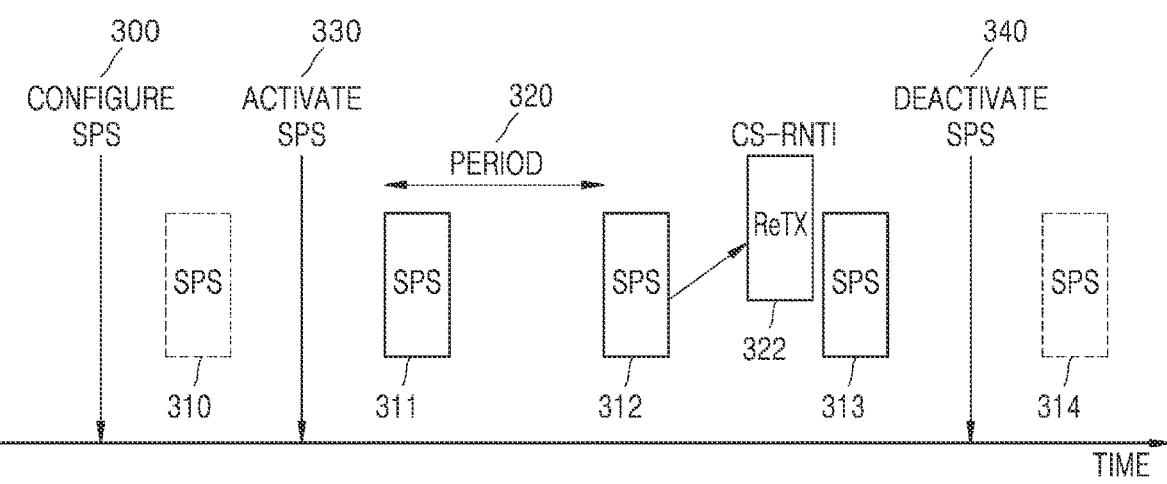
FIG. 3 illustrates a unicast semi persistent scheduling (SPS) operation, according to an embodiment of the disclosure.

FIG. 3 illustrates a unicast semi-persistent scheduling (SPS) operation, according to an embodiment of the disclosure.

In unicast communication where a BS and a UE communicates one to one, for a method by which the BS allocates a downlink radio resource (downlink grant) to the UE, there may be two methods: dynamic grant and SPS. The dynamic grant is a method by which the BS allocates each radio resource by changing a resource position and configuration of the radio resource, in which case the resource may be allocated in a PDCCH with a C-RNTI or an MCS-C-RNTI.

Once the resource is allocated by the dynamic grant, it is a one-shot resource meaning that only the allocated resource is valid. On the other hand, a resource allocated by the SPS refers to a resource allocated semi-persistently once configured.

The dynamic grant is inefficient because it allocates a resource by using a PDCCH resource and the PDCCH resource is repeatedly used to periodically allocate the same resource. In the case of having to periodically allocate the resource with the same configuration, enabling the resource with the same configuration to be repeatedly used without using the PDCCH resource after the resource is configured and activated once may be efficient because consumption of the PDCCH resource may be reduced.

In operation 300, the BS may configure an SPS resource by an RRC setup message or RRC reconfiguration message transmitted to the UE. The SPS configuration information may include essential information such as periodicity 320 of the SPS resource.

However, after the SPS is configured, there is no need to activate the SPS resource. It is because it may be more efficient to use the SPS resource only when the BS has DL data to be actually transmitted. Hence, when the SPS resource is configured, the SPS resource may not be used right away. In operation 310, the BS and the UE may not use the SPS resource because the SPS resource is not activated. Although a position of the non-activated SPS resource is illustrated as being virtually present in operation 310, a specific position of the SPS resource may be applied according to an SPS activation message, so the BS and the UE do not have SPS information not in use (e.g., position information of the SPS resource). In operation 330, when the UE receives the SPS activation message 330 transmitted by the BS to the UE, a DL radio resource is used with an actual SPS resource, and the UE may receive DL data.

In operation 330, the SPS activation message may be transmitted from the BS to the UE in a DCI format in a PDCCH by using a configured scheduling radio network temporary identity (CS-RNTI). In this case, certain information in the DCI may represent activation of SPS. The DCI indicates modulation and coding scheme (MCS) information to be used for the SPS resource or an accurate position of the SPS resource, so the UE may correctly know the information of the SPS resource transmitted from the BS after receiving the SPS activation message. When the SPS is activated, resource allocation may be repeated (311, 312 and 313) in every certain period 320, and no PDCCH resource is involved in the repeated resource allocation.

However, when successful transmission of data to be received by the UE using the SPS resource fails, the UE may notify the BS of the transmission failure by transmitting an HARQ non-acknowledgment (NACK) message. After receiving the HARQ NACK message, the BS may perform retransmission. A resource for retransmission of the SPS resource may be allocated by the BS on one time basis. In operation 322, the retransmission resource may be allocated in a PDCCH using a CS-RNTI.

In operation 340, the BS may deactivate the SPS when the SPS resource is no longer used. The SPS deactivation message may be transmitted in a DCI format of a PDCCH using a CS-RNTI. When the UE receives the SPS deactivation message, in operation 314, the UE may discard the configuration information received in the SPS activation message received in operation 330. However, the UE may not discard but use the configuration information received in the SPS configuration message received in operation 300 when the SPS is re-activated later.

Figure 4:
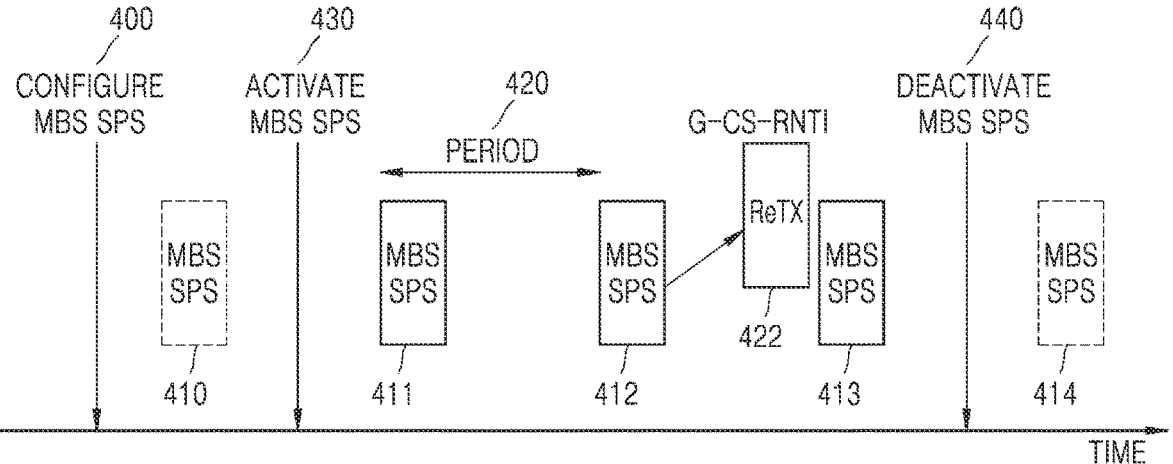
FIG. 4 illustrates an MBS SPS operation, according to an embodiment of the disclosure.

FIG. 4 illustrates an MBS SPS operation, according to an embodiment of the disclosure.

In multicast or broadcast communication where a BS communicates with many UEs, for a method by which the BS allocates a DL radio resource (downlink grant) to the UE, there may be two methods: dynamic grant and SPS. The dynamic grant is a method by which the BS allocates each radio resource by changing the resource position and configuration, in which case the resource may be allocated in a PDCCH by a G-RNTI shared by the UEs receiving the MBS service. Once the resource is allocated by the dynamic grant, it is a one-shot resource meaning that only the allocated resource is valid. On the other hand, a resource allocated by the SPS refers to a resource allocated semi-persistently once configured.

The dynamic grant is inefficient because it allocates a resource by using a PDCCH resource and the PDCCH resource is repeatedly used to periodically allocate the same resource. In the case of having to periodically allocate the resource with the same configuration, enabling the resource with the same configuration to be repeatedly used without using the PDCCH resource after the resource is configured and activated once may be efficient because consumption of the PDCCH resource may be reduced.

In operation 400, the BS may configure an MBS SPS resource by an RRC setup message or RRC reconfiguration message transmitted to the UE. In some embodiments, however, MBS SPS configuration information may be transmitted in an SIB transmitted by the BS to the UEs. The MBS SPS configuration information may include essential information such as periodicity 420 of the SPS resource. The MBS SPS configuration information may be shared by UEs that receive the MBS service, meaning that the MBS SPS is used by all the UEs. The UE that receives the MBS service may refer to a UE in the multicast group.

However, after the MBS SPS is configured, there is no need to activate the MBS SPS resource. It may be more efficient to use the MBS SPS resource only when the BS has DL data to be actually transmitted, so the MBS SPS resource does not need to be activated right after the MBS SPS is configured. Therefore, when the MBS SPS resource is configured, the BS and the UE are unable to use the MBS SPS in operation 410 because the MBS SPS resource has not been activated. Although a position of the non-activated MBS SPS resource is illustrated as being virtually present in operation 410, a specific position of the MBS SPS resource may be applied according to an MBS SPS activation message, so the BS and the UE do not have MBS SPS information not in use (e.g., position information of the MBS SPS resource). In operation 430, when the UE receives the MBS SPS activation message transmitted by the BS to the UE, a DL radio resource is used with an actual MBS SPS resource, and the UE may receive DL data.

In operation 430, the MBS SPS activation message may be transmitted in a DCI format of a PDCCH using a group configured scheduling RNTI (G-CS-RNTI). In this case, certain information in the DCI may represent activation of MBS SPS. The DCI indicates MCS information to be used for the MBS SPS resource or an accurate position of the MBS SPS resource, so the UE may correctly know the information of the MBS SPS resource transmitted from the BS after receiving the MBS SPS activation message. When the MBS SPS is activated, resource allocation may be repeated (411, 412 and 413) in every certain period 420, and no PDCCH resource is involved in the repeated resource allocation. In an embodiment, the MBS SPS activation message may be transmitted in the form of medium access control (MAC) control element (CE) or in the form of an RRC message. In various embodiments of the disclosure, a message including MCS information to be used for the MBS SPS resource or an accurate position of the MBS SPS resource is transmitted regardless of the format, so that the UE may receive data transmitted with the MBS SPS resource. A G-CS-RNTI may be included in the MBS SPS configuration information to be configured for the UE. The G-CS-RNTI may be shared by multiple UEs.

However, when successful transmission of data to be received by the UE using the MBS SPS resource fails, the UE may notify the BS of the transmission failure by transmitting an HARQ NACK message. After receiving the HARQ NACK message, the BS may perform retransmission. A resource for retransmission of the MBS SPS resource may be allocated by the BS on one time basis. In operation 422, the retransmission resource may be allocated in a PDCCH using the G-CS-RNTI.

Only when an initial transmission resource 412 transmitted with the MBS SPS resource is not successfully received, the UE may receive a resource allocated using the G-CS-RNTI. When initial data transmitted with the MBS SPS resource is successfully received, there is no need to additionally receive the resource allocated with the G-CS-RNTI. Specifically, when data previously transmitted with respect to the resource allocated with the G-CS-RNTI has been successfully received, there is no need to receive the resource allocated with the G-CS-RNTI again. When the data previously transmitted with respect to the resource allocated with the G-CS-RNTI has not been successfully received (e.g., when an MAC protocol data unit (PDU) for the corresponding HARQ process has never been received or a TB for the HARQ process has not been successfully decoded), the UE that is able to receive the MBS SPS resource may receive a retransmission resource using the G-CS-RNTI.

When the BS no longer uses the MBS SPS resource, the BS may deactivate the MBS SPS in operation 440. The SPS deactivation message may be transmitted in a DCI format of a PDCCH using the G-CS-RNTI. However, in other embodiments, the MBS SPS deactivation message may be transmitted in the form of an MAC CE or an RRC message. When the UE receives the MBS SPS deactivation message, in operation 414, the UE may discard the configuration information received in the SPS activation message received in operation 430. When the UE receives the deactivation message for the MBS SPS already discarded, this message may be a message retransmitted by the BS for the reason that the MBS SPS deactivation message has not been successfully sent to other UE, so the UE may discard the deactivation message. However, the UE may not discard but use the configuration information received in the MBS SPS configuration message received in operation 400 when the SPS is activated again later.

Figure 5:
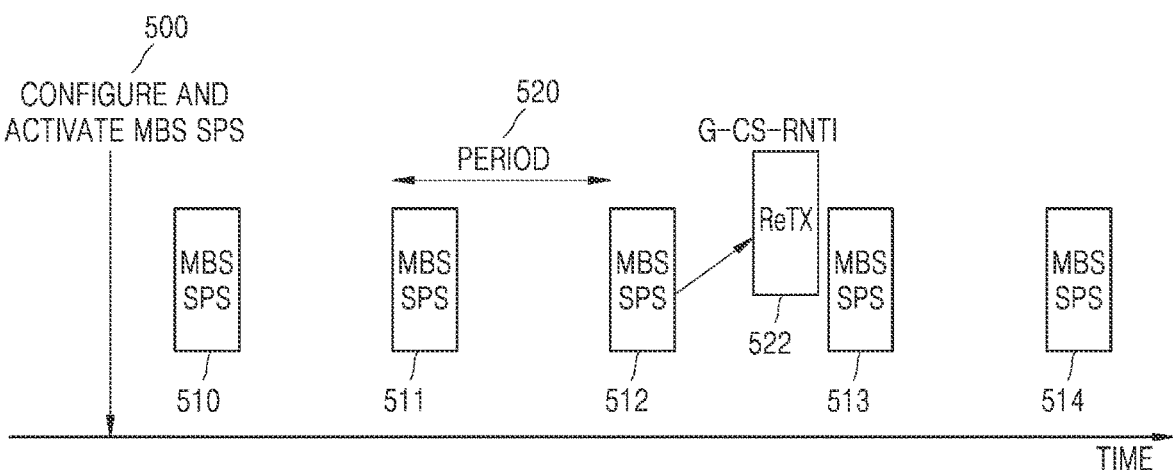
FIG. 5 illustrates an MBS SPS operation, according to an embodiment of the disclosure.

FIG. 5 illustrates an MBS SPS operation, according to an embodiment of the disclosure.

In multicast or broadcast communication where a BS communicates with many UEs, for a method by which the BS allocates a DL radio resource (downlink grant) to the UE, there may be two methods: dynamic grant and SPS. The dynamic grant is a method by which the BS allocates each radio resource by changing the resource position and configuration, in which case the resource may be allocated in a PDCCH by a G-RNTI shared by the UEs receiving the MBS service. Once the resource is allocated by the dynamic grant, it is a one-shot resource meaning that only the allocated resource is valid. On the other hand, a resource allocated by the SPS refers to a resource allocated semi-persistently once configured.

The dynamic grant is inefficient because it allocates a resource by using a PDCCH resource and the PDCCH resource is repeatedly used to periodically allocate the same resource. In the case of having to periodically allocate the resource with the same configuration, enabling the resource with the same configuration to be repeatedly used without using the PDCCH resource after the resource is configured and activated once may be efficient because consumption of the PDCCH resource may be reduced.

In operation 500, the BS may configure an MBS SPS resource by an RRC setup message or RRC reconfiguration message transmitted to the UE. In another embodiment, MBS SPS configuration information may be transmitted in an SIB transmitted by the BS to the UEs. In an embodiment, the MBS SPS may be activated as soon as it is configured.

In the embodiment of FIG. 5, an operation in which the UE successfully receives an MBS SPS configuration message and applies the configuration may include an operation of activating MBS SPS without receiving a separate MBS SPS activation message.

As multiple UEs may use the MBS SPS resource simultaneously for the MBS SPS, it is more likely that the MBS SPS resource has already been activated and used when a UE is configured with the MBS SPS. Information of the MBS SPS configuration and activation message may include not only essential information such as periodicity 520 of the SPS resource but also MCS information or an accurate position of the MBS SPS resource, enabling the UE to receive the MBS SPS resource right away. After receiving the MBS SPS configuration and activation message, the UE may know accurate information of the MBS SPS resource transmitted from the BS. Furthermore, an MBS SPS activation indication message may include a reference system frame number (SFN) with which the MBS SPS starts to be configured, and the UE may use the resource by applying an offset for the MBS SPS resource position based on the reference SFN. Subsequently, the UE may use the MBS SPS resource that is repeated (510, 511, 512, 513 and 514) in every certain period 520. The PDCCH resource is not involved in repeatedly using the MBS SPS resource.

However, when successful transmission of data to be received by the UE using the MBS SPS resource fails, the UE may notify the BS of the transmission failure by transmitting an HARQ NACK message. After receiving the HARQ NACK message, the BS may perform retransmission. A resource for retransmission of the MBS SPS resource may be allocated by the BS on one time basis. In operation 522, the retransmission resource may be allocated in a PDCCH using the G-CS-RNTI. Only when an initial transmission resource 512 transmitted with the MBS SPS resource is not successfully received, the UE may receive a resource allocated using the G-CS-RNTI. When initial transmission data transmitted with the MBS SPS resource is already received successfully, there is no need to additionally receive a resource allocated with the G-CS-RNTI. Specifically, when data previously transmitted with respect to the resource allocated with the G-CS-RNTI has been successfully received, there is no need to receive the resource allocated with the G-CS-RNTI again. When the data previously transmitted with respect to the resource allocated with the G-CS-RNTI has not been successfully received (e.g., when an MAC PDU for the corresponding HARQ process has never been received or a TB for the HARQ process has not been successfully decoded), the UE that is able to receive the MBS SPS resource may receive a retransmission resource using the G-CS-RNTI.

Figure 6:
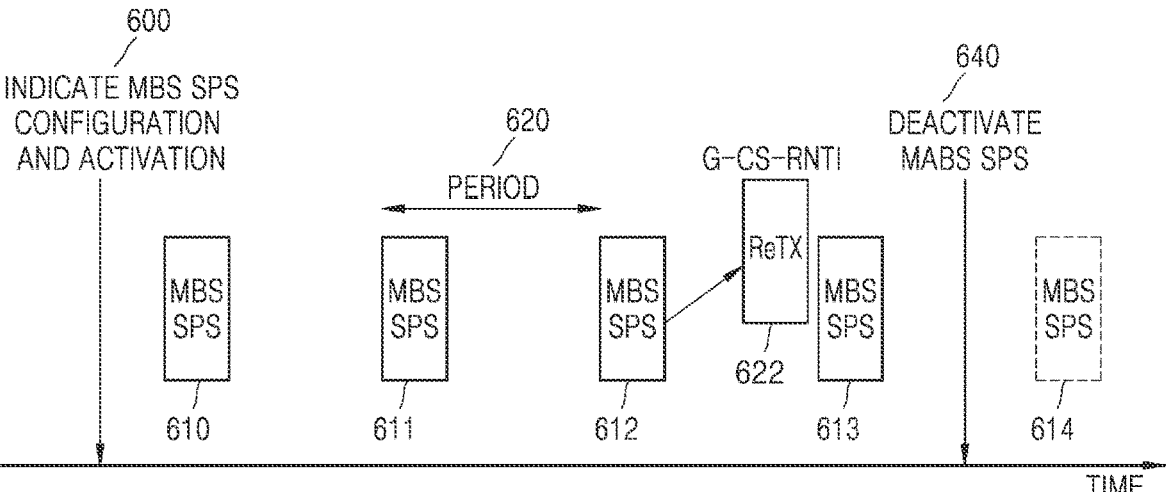
FIG. 6 illustrates an MBS SPS operation, according to an embodiment of the disclosure.

FIG. 6 illustrates an MBS SPS operation, according to an embodiment of the disclosure.

In multicast or broadcast communication where a BS communicates with many UEs, for a method by which the BS allocates a DL radio resource (downlink grant) to the UE, there may be two methods: dynamic grant and SPS. The dynamic grant is a method by which the BS allocates each radio resource by changing the resource position and configuration, in which case the resource may be allocated in a PDCCH by a G-RNTI shared by the UEs receiving the MBS service. Once the resource is allocated by the dynamic grant, it is a one-shot resource meaning that only the allocated resource is valid. On the other hand, a resource allocated by the SPS refers to a resource allocated semi-persistently once configured.

The dynamic grant is inefficient because it allocates a resource by using a PDCCH resource and the PDCCH resource is repeatedly used to periodically allocate the same resource. In the case of having to periodically allocate the resource with the same configuration, enabling the resource with the same configuration to be repeatedly used without using the PDCCH resource after the resource is configured and activated once may be efficient because consumption of the PDCCH resource may be reduced.

In operation 600, the BS may configure an MBS SPS resource by an RRC setup message or RRC reconfiguration message transmitted to the UE. In some embodiments, MBS SPS configuration information may be transmitted in an SIB transmitted by the BS to the UEs. In an embodiment, the MBS SPS may be indicated to be activated as soon as it is configured.

In an embodiment of FIG. 6, the BS may transmit an indicator indicating activation of MBS SPS in an MBS SPS configuration message, and the UE may perform an operation of activating MBS SPS when the indicator indicating activation of the MBS SPS is included in the MBS SPS configuration message.

As multiple UEs may use the MBS SPS resource simultaneously for the MBS SPS, it is more likely that the MBS SPS resource has already been activated and used when a UE is configured with the MBS SPS. Information of the message indicating activation of MBS SPS at the same time as MBS SPS configuration may include not only essential information for MBS SPS configuration such as periodicity 620 of the SPS resource but also MCS information required for activation of MBS SPS or an accurate position of the MBS SPS resource, which enables the UE to receive the MBS SPS resource right away. In an embodiment, when the UE receives information indicating a position of the MBS resource or an MCS required for activation of MBS SPS instead of the indicator indicating activation of MBS SPS, MBS SPS may be activated. After receiving the MBS SPS configuration and activation message, the UE may know accurate information of the MBS SPS resource transmitted from the BS. Furthermore, an MBS SPS activation indication information may include a reference SFN with which the MBS SPS starts to be configured, and the UE may use a resource by applying an offset for the MBS SPS resource position based on the reference SFN. Subsequently, the UE may use the MBS SPS resource that is repeated (610, 611, 612 and 613) in every certain period 620. The PDCCH resource is not involved in repeatedly using the MBS SPS resource. When MBS SPS is only configured but not indicated to be activated in operation 600, MBS SPS may be activated later according to such an MBS SPS activation message transmitted in operation 430 of FIG. 4.

However, when successful transmission of data to be received by the UE by using the MBS SPS resource fails, the UE may notify the BS of the transmission failure by transmitting an HARQ NACK message. After receiving the HARQ NACK message, the BS may perform retransmission. A resource for retransmission of the MBS SPS resource may be allocated by the BS on one time basis. In operation 622, the retransmission resource may be allocated in a PDCCH using a G-CS-RNTI. Only when an initial transmission data 612 transmitted in the MBS SPS resource is not successfully received, the UE may receive a resource allocated with the G-CS-RNTI. When initial transmission data transmitted with the MBS SPS resource is already received successfully, there is no need to additionally receive a resource allocated with the G-CS-RNTI. Specifically, when data previously transmitted with respect to the resource allocated with the G-CS-RNTI has been successfully received, there is no need to receive the resource allocated with the G-CS-RNTI again. When the data previously transmitted with respect to the resource allocated with the G-CS-RNTI has not been successfully received (e.g., when an MAC PDU for the corresponding HARQ process has never been received or a TB for the HARQ process has not been successfully decoded), the UE that is able to receive the MBS SPS resource may receive a retransmission resource using the G-CS-RNTI.

When the BS no longer uses the MBS SPS resource, the BS may deactivate the MBS SPS in operation 640. The MBS SPS deactivation message may be transmitted in a DCI format of a PDCCH using the G-CS-RNTI. However, in other embodiments, the MBS SPS deactivation message may be transmitted in the form of an MAC CE or an RRC message. When the UE receives the MBS SPS deactivation message, in operation 614, the UE may discard the configuration information received in the SPS activation message received in operation 630. When the UE receives the deactivation message for the MBS SPS already discarded, this message may be a message retransmitted by the BS for the reason that the MBS SPS deactivation message has not been successfully sent to other UE, so the UE may discard the deactivation message. However, the UE may not discard but use the configuration information received in the MBS SPS configuration message received in operation 600 when the SPS is activated again later.

Figure 7:
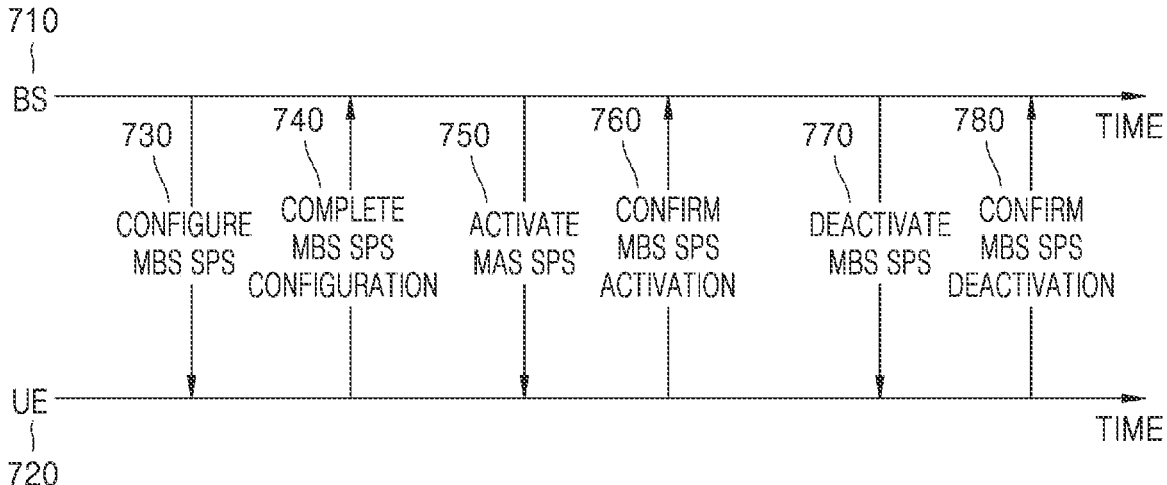
FIG. 7 illustrates a method of transmitting MBS SPS activation and deactivation confirmation messages, according to an embodiment of the disclosure.

FIG. 7 illustrates a method of transmitting MBS SPS activation and deactivation confirmation messages, according to an embodiment of the disclosure.

In operation 730, a BS 710 may configure an MBS SPS resource by an RRC setup message or RRC reconfiguration message transmitted to a UE 720. Essential information such as periodicity of the SPS resource may be configured in the MBS SPS configuration information. The UE 720 receiving the message to configure MBS SPS may apply the received message. After applying the message to configure the MBS SPS, the UE 720 may transmit an MBS configuration complete message in operation 740 to notify the BS 710 that the UE 720 has successfully received and applied the message. When the MBS SPS configuration message transmitted from the BS 710 uses some configurations of the RRC message in operation 730, the MBS SPS configuration complete message 740 transmitted from the UE 720 in operation 740 may be an RRC setup complete message or RRC reconfiguration complete message defined as an RRC message.

However, after the MBS SPS is configured, there is no need to activate the MBS SPS resource. It is because it may be more efficient to use the MBS SPS resource only when the BS 710 has DL data to be actually transmitted. Hence, when the MBS SPS resource is configured, the MBS SPS resource may not be used right away.

In operation 750, when the UE 720 receives an MBS SPS activation message transmitted by the BS 710 to the UE 720, a DL radio resource is used with an actual MBS SPS resource, and the UE 720 may receive DL data.

The MBS SPS activation message may be transmitted from the BS 710 to the UE 720 in a DCI format of a PDCCH by using a G-CS-RNTI. In this case, certain information in the DCI may represent activation of MBS SPS. The DCI indicates MCS information to be used for the MBS SPS resource or an accurate position of the MBS SPS resource, so the UE 720 may correctly know the information of the MBS SPS resource transmitted from the BS 710 after receiving the MBS SPS activation message. When the MBS SPS is activated, resource allocation may be repeated in every certain period, and no PDCCH resource is involved in the repeated resource allocation.

In an embodiment, the MBS SPS activation message may be transmitted in the form of an MAC CE or in the form of an RRC message. In various embodiments of the disclosure, a message including MCS information to be used for the MBS SPS resource or an accurate position of the MBS SPS resource is transmitted regardless of the format, so that the UE 720 may receive data transmitted with the MBS SPS resource.

As the MBS SPS activation message for MBS SPS is transmitted in multicast or broadcast, it is difficult for the BS 710 to know of whether the MBS SPS activation has been correctly performed for all the UEs. Also, the MBS service has a multicast or broadcast method and may be hardly considered as always having feedback on the data transmitted using MBS SPS. Hence, in operation 760, the UE 720 may notify the BS 710 of whether MBS SPS activation has been made. The operation of the UE 720 notifying the BS 710 of whether MBS SPS has been activated may be referred to as MBS SPS activation confirmation. An MBS SPS activation confirmation message may be created after activation of MBS SPS is indicated from the BS 710 in operation 750 and transmitted to the BS 710. The MBS SPS activation confirmation message may be transmitted in the form of an MAC CE. In another embodiment, the MBS SPS activation confirmation message may have an uplink control information (UCI) format of a PUCCH. In another embodiment, the MBS SPS activation confirmation message may have the form of an RRC message.

When the MBS SPS activation is also indicated in the MBS SPS configuration message as shown in FIG. 6, the UE 720 may not transmit the MBS SPS activation confirmation message. The MBS SPS activation confirmation message may include an identity of MBS SPS to distinguish which MBS SPS it is to confirm the activation. Alternatively, the MBS activation confirmation message may include a field corresponding to the MBS SPS configuration, and indicate whether the MBS SPS activation message has been received (or applied).

When the BS 710 has used activated MBS SPS and no longer uses the MBS SPS resource afterward, the BS 710 may deactivate the MBS SPS in operation 770. The deactivation message may be transmitted in a DCI format of a PDCCH using the G-CS-RNTI. However, in another embodiment, the MBS SPS deactivation message may be transmitted in the form of an MAC CE or an RRC message.

When the UE 720 receives MBS SPS deactivation message, the UE 720 may discard the configuration information received in the SPS activation message received in operation 750. When the UE 720 receives the deactivation message for the MBS SPS already discarded, this message may be a message retransmitted by the BS 710 for the reason that the MBS SPS deactivation message has not been successfully sent to other UE, so the UE 720 may discard the message. However, the UE 720 may not discard but use the configuration information received in the MBS SPS configuration message received in operation 730 when the SPS is re-activated later.

As the MBS SPS deactivation message for MBS SPS is transmitted in multicast or broadcast, it is difficult for the BS 710 to know of whether the MBS SPS deactivation has been correctly performed for all the UEs. Also, the MBS service has a multicast or broadcast method and may be hardly considered as always having feedback on the data transmitted using MBS SPS. Hence, in operation 780, the UE 720 may notify the BS 710 of whether MBS SPS deactivation has been made. The operation of the UE 720 notifying the BS 710 of whether MBS SPS has been deactivated may be referred to as MBS SPS deactivation confirmation. An MBS SPS deactivation confirmation message may be created after deactivation of MBS SPS is indicated from the BS 710 in operation 770 and transmitted to the BS 710. The MBS SPS deactivation confirmation message may be transmitted in the form of an MAC CE. In another embodiment, the MBS SPS deactivation confirmation message may have a UCI format of a PUCCH. In another embodiment, the MBS SPS deactivation confirmation message may have the form of an RRC message.

The MBS SPS deactivation confirmation message may include an identity of MBS SPS to distinguish which MBS SPS it is to confirm the deactivation. Alternatively, the MBS SPS deactivation confirmation message may include a field corresponding to the MBS SPS configuration, and indicate whether the MBS SPS deactivation message has been received (or applied). In an embodiment, the MBS SPS activation confirmation message transmitted from the UE 720 in operation 760 and the MBS SPS deactivation confirmation message transmitted in operation 780 may use the same message format. For example, the MBS SPS activation confirmation message or the MBS SPS deactivation confirmation message may include an identity of MBS SPS or a field value corresponding to the identity of MBS SPS to indicate the MBS SPS activation or deactivation.

Figure 8:
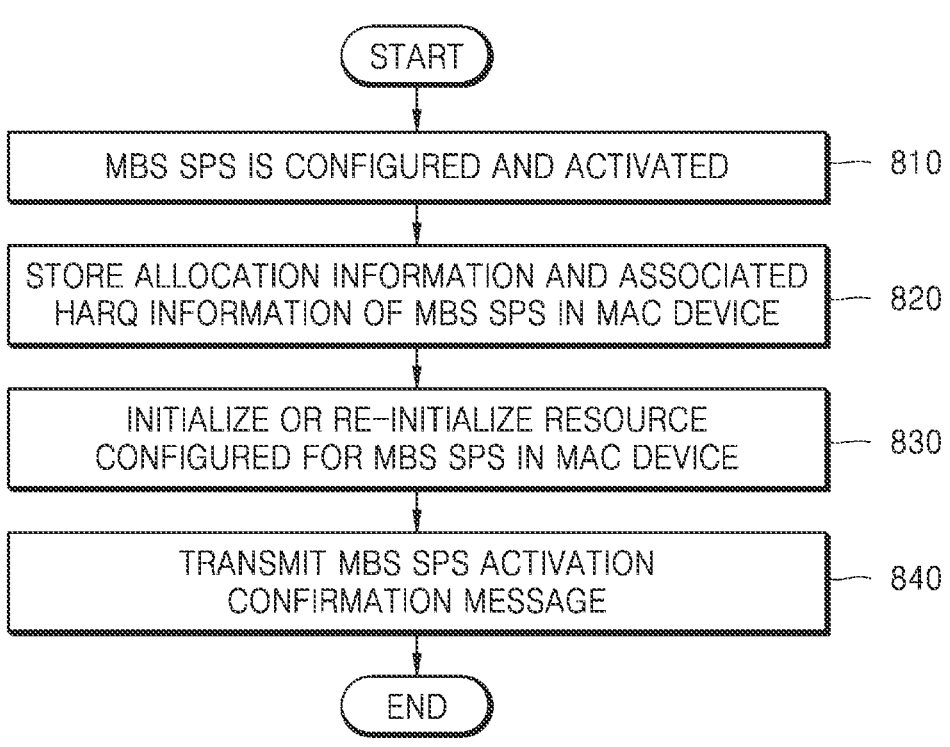
FIG. 8 illustrates operations of a base station (BS) and a user equipment (UE) when MBS SPS is activated, according to an embodiment of the disclosure.

FIG. 8 illustrates operations of a BS and a UE when MBS SPS is activated, according to an embodiment of the disclosure.

In operation 810, MBS SPS may be configured and activated. In the embodiment of FIG. 8, as described above in connection with operations 430, 500, 600 and 750, activation of MBS SPS may be indicated by the BS to the UE. The activation of MBS SPS may be indicated by using a PDCCH resource with a G-CS-RNTI, in which case a new data indicator (NDI) value may be set to 0 to indicate MBS SPS activation.

When the MBS SPS is activated, MAC layer entities of the UE and the BS may store MBS SPS allocation information and HARQ information associated with the MBS SPS allocation information in operation 820. The HARQ information may correspond to at least one of an HARQ process, MCS related information or a TB size.

In operation 830, the MAC layer entity may initialize or reinitialize the resource configured for the MBS SPS. When an MBS SPS resource is activated from an inactive state, it may correspond to initialization, and when an already active MBS SPS resource is reactivated, it may correspond to reinitialization.

The UE then receives an MBS SPS activation message and needs to notify application of this to the BS. In operation 840, the UE may transmit a confirmation message of the MBS SPS activation. The MBS SPS activation confirmation message may be transmitted in the form of an MAC CE. In another embodiment, the MBS SPS activation confirmation message may have a UCI format of a PUCCH. In another embodiment, the MBS SPS activation confirmation message may have the form of an RRC message.

When the MBS SPS activation is also indicated in the MBS SPS configuration message as shown in FIG. 6, the UE may not transmit the MBS SPS activation confirmation message. The MBS SPS activation confirmation message may include an identity of the MBS SPS to distinguish which MBS SPS it is to confirm the activation. Alternatively, the MBS SPS activation confirmation message may include a field corresponding to the MBS SPS configuration, and indicate whether the MBS SPS activation message has been received (or applied). When receiving the MBS SPS activation message from the UE, the BS may recognize that the MBS SPS has been successfully activated for the UE. Otherwise, when failing to receive the MBS SPS activation message, the BS may recognize that the UE has not activated the MBS SPS and retransmit the MBS SPS activation message.

Figure 9:
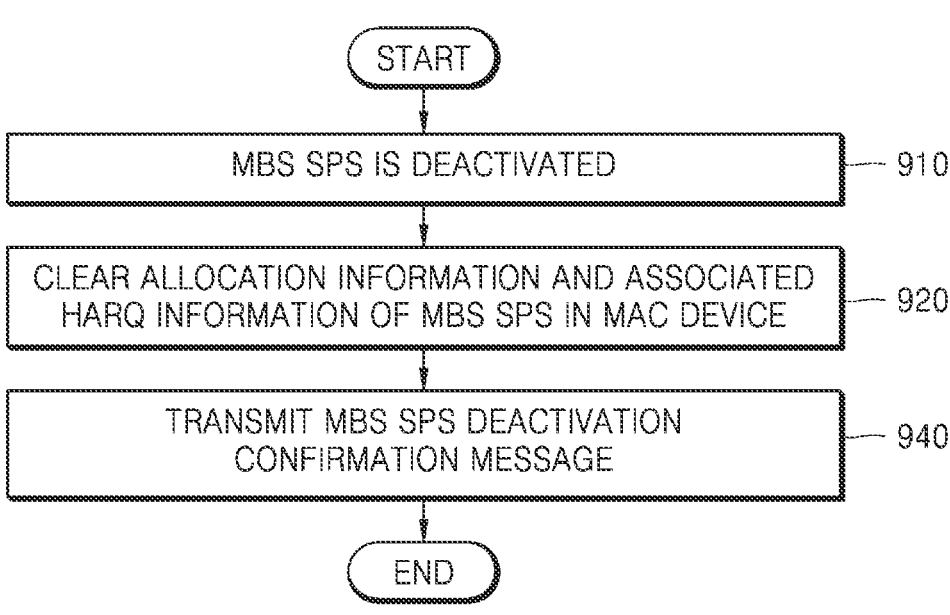
FIG. 9 illustrates operations of a BS and a UE when MBS SPS is deactivated, according to an embodiment of the disclosure.

FIG. 9 illustrates operations of a BS and a UE when MBS SPS is deactivated, according to an embodiment of the disclosure.

In operation 910, MBS SPS may be deactivated. In the embodiment of FIG. 9, as described above in connection with operations 440, 640, 770, etc., deactivation of the MBS SPS may be indicated by the BS to the UE. The deactivation of the MBS SPS may be indicated using a PDCCH resource with a G-CS-RNTI, in which case an NDI value may be set to 0 to indicate MBS SPS deactivation.

When the MBS SPS is deactivated, MAC layer entities of the UE and the BS may clear MBS SPS allocation information and associated HARQ information in operation 920. The HARQ information may correspond to at least one of an HARQ process, MCS related information or a TB size.

The UE then receives an MBS SPS deactivation message and needs to notify application of this to the BS. Hence, in operation 930, the UE may transmit a confirmation message for the MBS SPS deactivation. The MBS SPS deactivation confirmation message may be transmitted in the form of MAC CE. In another embodiment, the MBS SPS deactivation confirmation message may have a UCI format of a PUCCH. In another embodiment, the MBS SPS deactivation confirmation message may have the form of an RRC message. The MBS SPS deactivation confirmation message may include an identity of MBS SPS to distinguish which MBS SPS it is to confirm the deactivation. Alternatively, the MBS SPS deactivation confirmation message may include a field corresponding to the MBS SPS configuration, and indicate whether the MBS SPS deactivation message has been received (or applied).

When receiving the MBS SPS deactivation message from the UE, the BS may recognize that the UE has successfully deactivated the MBS SPS. Otherwise, when failing to receive the MBS SPS deactivation message, the BS may recognize that the UE has not deactivated the MBS SPS and retransmit the MBS SPS deactivation message.

In an embodiment, a UE in an idle mode or inactive mode may receive MBS SPS data after configuring and activating the MBS SPS. When the UE receives an indication to deactivate the MBS SPS from the BS while receiving the MBS SPS data, the UE may be switched into a connected mode. The UE may be switched into the connected mode, and may transmit, to the BS, a confirmation message indicating that the UE has received and applied the MBS SPS deactivation message. However, in an embodiment, only when the UE in the idle mode or inactive mode no longer receives an MBS service of interest due to the MBS SPS deactivation, the UE may be switched into the connected mode and send information of the MBS service of interest to the BS. The BS may then provide the MBS service again for the UE.

Figure 10:
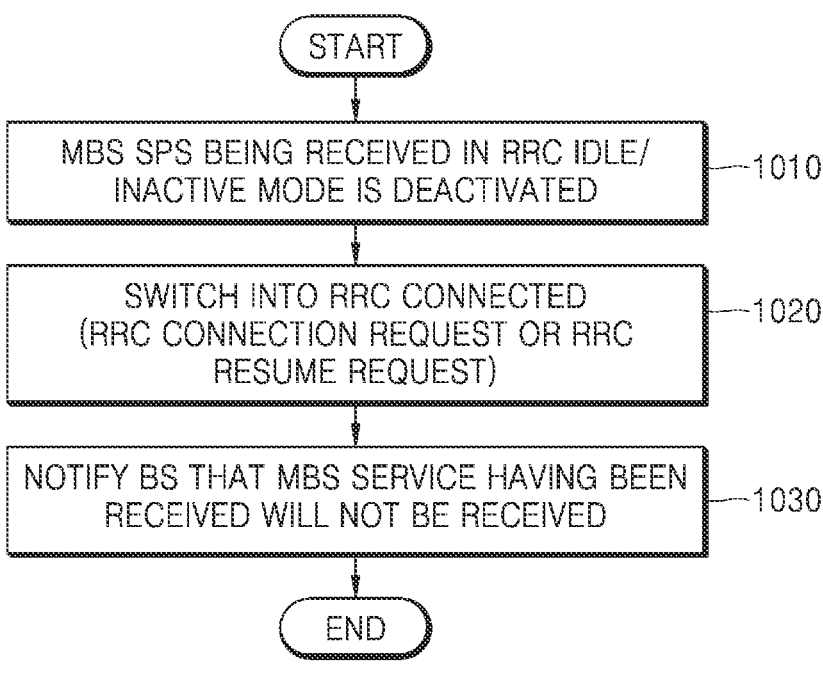
FIG. 10 illustrates operations of a UE in an idle mode or inactive mode when MBS SPS is deactivated, according to an embodiment of the disclosure.

FIG. 10 illustrates operations of a UE in an idle mode or inactive mode when MBS SPS is deactivated, according to an embodiment of the disclosure.

The UE in an idle mode or inactive mode may not perform direct communication while disconnected from the BS. The UE may periodically receive a paging message from the BS, and may be switched into the connected mode by determining based on the paging message whether there is a DL message to be transmitted to the UE. However, the UE in the idle mode or inactive mode may receive an MBS service from the BS. This is enabled by MBS service configuration information to be used in the idle mode or inactive mode in an RRC release message received before the UE is switched from the connected mode to the idle mode or inactive mode or by an SIB that may be received from the BS. In this case, information of the MBS service may include MBS SPS configuration and activation information.

In an embodiment of FIG. 10, in operation 1010, the MBS SPS may be deactivated while the UE in the idle mode or inactive mode is receiving the MBS service with the MBS SPS. The BS may know that the UE in the connected mode receives the MBS SPS, but hardly know correctly that the UE in the idle mode or inactive mode receives the MBS SPS. Hence, when the BS deactivates the MBS SPS that has provided the MBS service, there may be a UE in the idle mode or inactive mode which requires MBS service provision using the MBS SPS resource.

In operation 1020, the UE may be switched into the connected mode when the MBS SPS having provided the MBS service in the idle mode or inactive mode is deactivated. Furthermore, the UE in the idle mode or inactive mode may also be switched into the connected mode when the MBS SPS having provided the MBS service is released. In an embodiment, a tmgi for which the MBS service is provided in the MBS SPS resource may be configured. The UE may be switched into the connected mode only when the MBS SPS for a service of interest or the tmgi for which the service is provided is deactivated or released.

To be switched from the idle mode to the connected mode, the UE may transmit an RRC connection request message to the BS. To be switched from the inactive mode to the connected mode, the UE may transmit an RRC connection resume message to the BS.

When the UE is switched into the connected mode, the UE may notify the BS that it is not now available to receive the MBS service being received in the MBS SPS resource. In an embodiment, the notification that it is not available to receive the MBS service may have the form of an MBS SPS deactivation confirmation message. In another embodiment, the notification that it is not available to receive the MBS service may be transmitted with a list of MBS services having thus far been received but now unavailable to be received (e.g., a list of tmgis) in an RRC message transmitted to the BS when switching into the connected mode is made. According to such information, the BS may provide the MBS service again to the UE.

Figure 11:
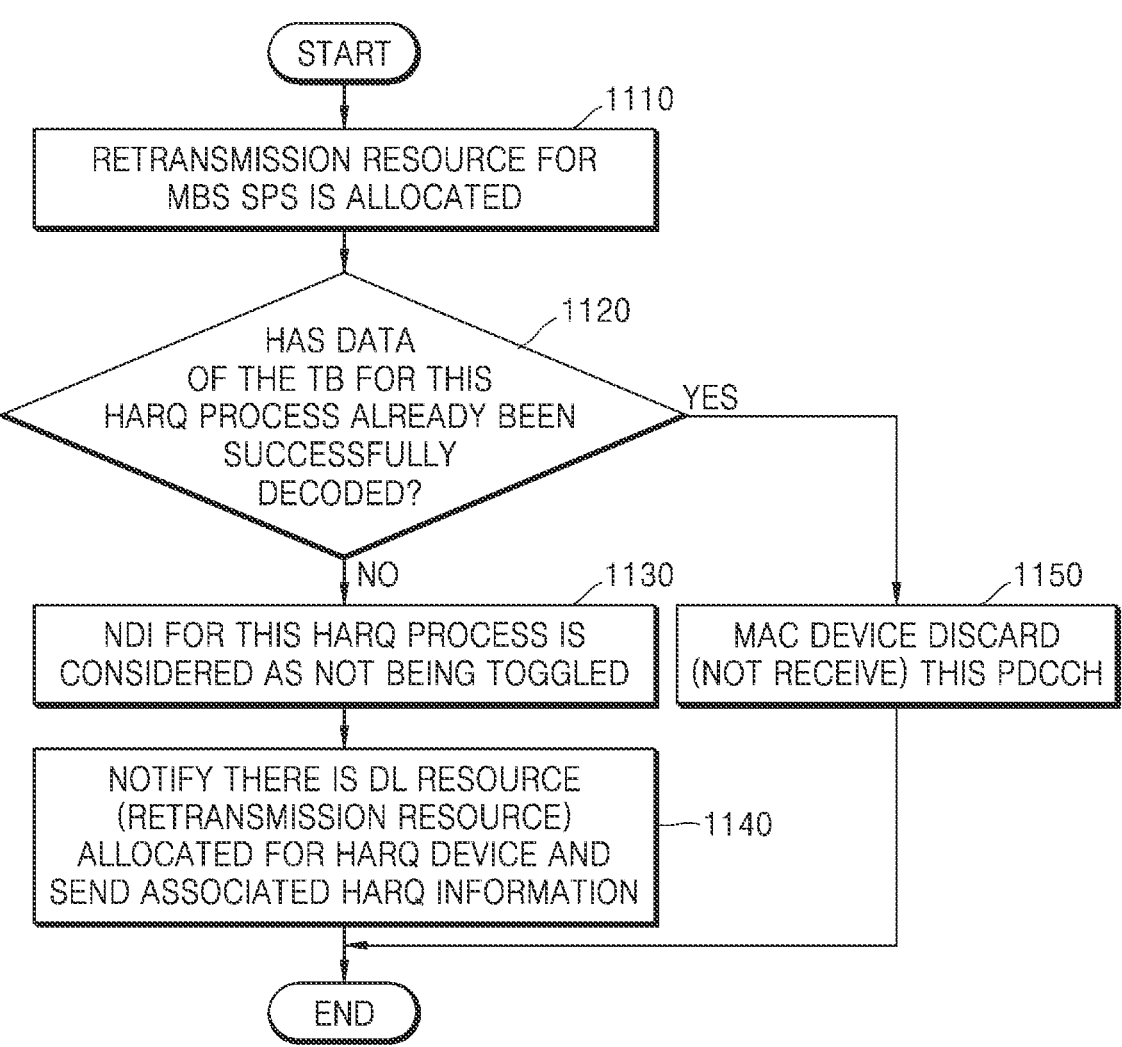
FIG. 11 illustrates operations of a UE with respect to MBS SPS retransmission resources, according to an embodiment of the disclosure.

FIG. 11 illustrates operations of a UE with respect to MBS SPS retransmission resources, according to an embodiment of the disclosure.

When initial transmission using MBS SPS fails, at least one UE may transmit feedback such as NACK to the BS. In operation 1110, the BS may allocate a retransmission resource of an MBS SPS resource to the UE based on the feedback. The UE may be allocated by the BS the retransmission resource for MBS SPS. The retransmission resource may be transmitted in a DCI format of a PDCCH using the G-CS-RNTI. In this case, the BS may set the NDI value included in the information transmitted to 1 to indicate that the information transmitted represents an MBS SPS retransmission resource.

In operation 1120, the UE may determine whether data in a TB (or corresponding MAC PDU) for an HARQ process has already been successfully decoded (or successfully received) according to initial transmission or previous retransmission of the MBS SPS resource.

When it is not already transmitted successfully, the UE needs to receive a retransmission resource. Accordingly, in operation 1130, the UE may consider that an NDI for the HARQ process is not toggled and perform an operation for retransmission. In operation 1140, the UE may notify that there is a DL resource (retransmission resource) allocated to an HARQ device and send associated HARQ information.

On the other hand, when the data in the TB for the HARQ process has already been successfully decoded in operation 1120, an MAC layer entity may discard and may not receive the PDCCH in operation 1150. As it is assumed that MBS services are provided in multicast or broadcast transmitted to multiple UEs, operation 1150 may be performed when the UE has already received the data successfully but the BS performs retransmission for other UE.

Figure 12:
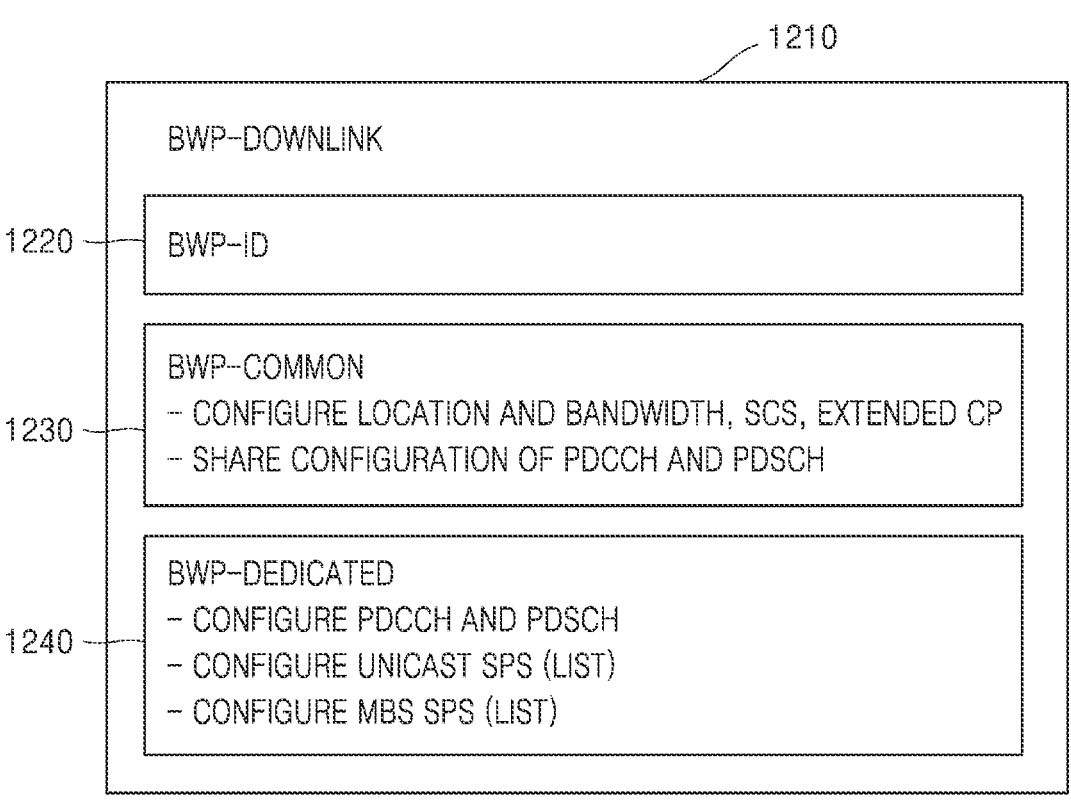
FIG. 12 illustrates a structure in which MBS SPS is configured, according to an embodiment of the disclosure.

FIG. 12 illustrates a structure in which MBS SPS is configured, according to an embodiment of the disclosure.

One MBS SPS may be configured for one bandwidth part (BWP). Hence, configuration of the MBS SPS may depend on DL BWP configuration (BWP-downlink) 1210. Each DL BWP may be distinguished by a BWP identity, BWP-ID 1220, and configured under the configuration of a serving cell. The DL BWP configuration may be performed for common BWP information 1230 and dedicated BWP information 1240 separately. The common BWP information 1230 may include a position and bandwidth of the BWP, subcarrier spacing, whether to use extended cyclic prefix (CP), and common configuration information for PDCCH and PDSCH. The dedicated BWP information 1240 may include not only PDCCH and PDSCH configurations but also unicast SPS configuration information and MBS SPS configuration information. The MBS SPS configuration information may include configuration information for MBS SPS that may be configured for multiple UEs, which may mean as including unicast SPS and other configuration (Config) information.

The MBS SPS configuration information may include at least one of a G-CS-RNTI value used for MBS SPS, a number of HARQ processes used (nofHARQ-Processes), an offset of an HARQ process (harq-ProcID-Offset), a period of MBS SPS, an identifier for identifying MBS SPS, or a list of MBS services provided in the corresponding MBS SPS (tmgi).

The unicast SPS and the MBS SPS may be configured at the same time in the dedicated BWP DL. In an embodiment, to identify the unicast SPS and the MBS SPS, a delimiter indicating that this SPS is the MBS SPS may be included in the SPS configuration information. When the delimiter included in the SPS configuration information is set to true, it may indicate that this SPS is MBS SPS. Data of the MBS SPS may correspond to a point-to-multipoint (PTM) bearer. When the delimiter included in the SPS configuration information is set to false, it may indicate that this SPS is unicast SPS. In an embodiment, when the SPS configuration information includes a G-CS-RNTI or a list of MBS services provided (e.g., a tmgi list), the SPS may be classified as the MBS SPS.

MBS SPS may be configured in the plural in the corresponding BWP or in the corresponding UE, so an identity for identifying each MBS SPS may be configured. The identity of the MBS SPS shares the same SPS configuration ID with the unicast SPS, and may identify the MBS SPS with a delimiter indicating the MBS SPS. A DL BWP configuration (BWP-Downlink) including the configuration of the MBS SPS may be transmitted in an RRC message or in an SIB and thus configured for the UE.

Figure 13:
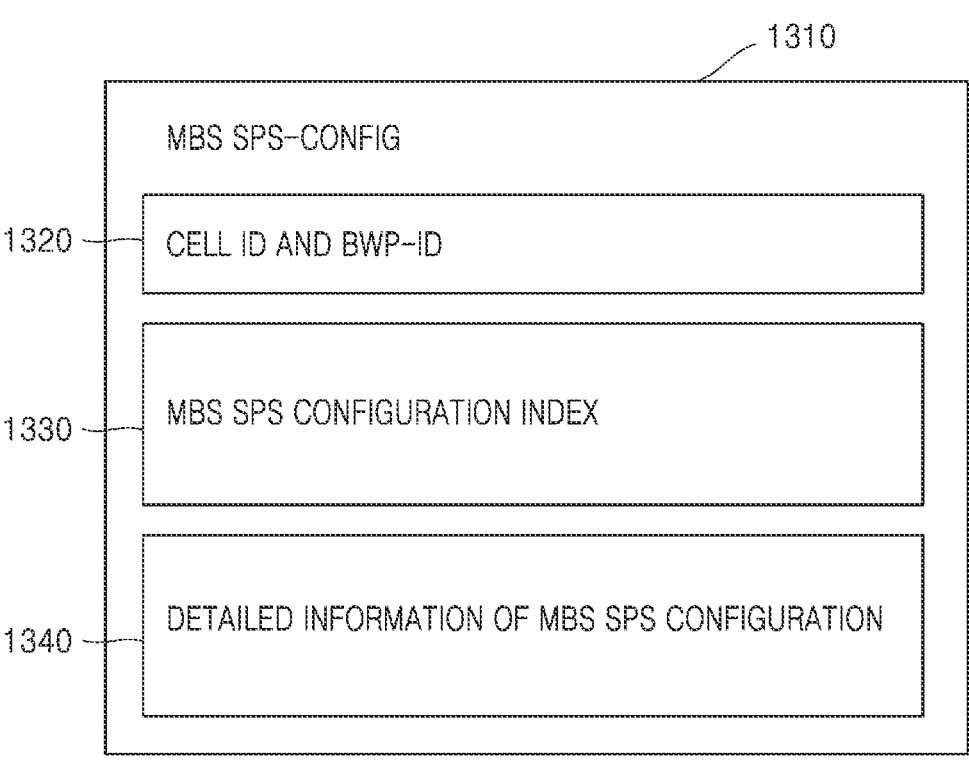
FIG. 13 illustrates a structure in which MBS SPS is configured, according to an embodiment of the disclosure.

FIG. 13 illustrates a structure in which MBS SPS is configured, according to an embodiment of the disclosure.

MBS SPS has a form of a resource providing an MBS service, and may thus be configured in each cell or each cell group configured for the UE. The embodiment of FIG. 13 represents a case that an MBS SPS configuration (MBS SPS-Config) is used separately. An MBS SPS configuration 1310 may include a cell ID and a BWP ID 1320 with which the MBS SPS is configured to indicate a BWP in which the MBS SPS is configured. Furthermore, as the MBS SPS may be configured in the plural in the BWP or UE, so the MBS SPS configuration 1310 may include an identity for identifying each MBS SPS. The identity for identifying the MBS SPS may be referred to as an MBS SPS configuration index 1330. Furthermore, the MBS SPS configuration 1310 may include detailed information 1340 for MBS SPS. The detailed information may include at least one of a G-CS-RNTI value used for MBS SPS, a number of HARQ processes used (nofHARQ-Processes), an offset of an HARQ process (harq-ProcID-Offset), a period of MBS SPS, an identifier for identifying MBS SPS, or a list of MBS services provided in the corresponding MBS SPS (e.g., a tmgi list). Data of the MBS SPS may correspond to a PTM bearer. The MBS SPS configuration may be transmitted in an RRC message or in an SIB, and configured for the UE.

Figure 14:
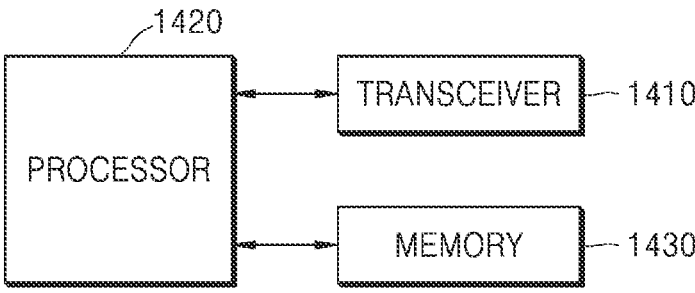
FIG. 14 is a block diagram of a BS, according to an embodiment of the disclosure.

FIG. 14 is a block diagram of a BS, according to an embodiment of the disclosure.

Referring to FIG. 14, a BS may include a transceiver 1410, a processor 1420, and a memory 1430. In the disclosure, the processor 1420 may be a circuit or an application specific integrated circuit (ASIC), and may include at least one processor. Various embodiments of the disclosure are not limited to the illustration of FIG. 14, and the BS may include more or fewer components than the components of FIG. 14. In addition, the transceiver 1410, the processor 1430, and the memory 1420 may be implemented in a single chip.

The transceiver 1410 may transmit or receive signals to or from another network entity. The transceiver 1410 may, for example, transmit system information to a UE and transmit a sync signal or a reference signal. The signals to be transmitted to or received from the UE or the network entity may include control information and data. For this, the transceiver 1410 may include an RF transmitter for up-converting the frequency of a signal to be transmitted and amplifying the signal and an RF receiver for low-noise amplifying a received signal and down-converting the frequency of the received signal. It is merely an example of the transceiver 1410, and the elements of the transceiver 1410 are not limited to the RF transmitter and RF receiver. In addition, the transceiver 1410 may receive a signal on a wireless channel and output the signal to the processor 1420, or transmit a signal output from the processor 1420 on a wireless channel.

The processor 1420 may control general operation of the BS according to the embodiment of the disclosure. For example, the processor 1420 may control signal flows between the respective blocks to perform the operation of the BS as described above with reference to FIGS. 1 to 13.

The memory 1430 may store at least one of information received or for transmission by the transceiver 1410 and information generated by the processor 1420. The memory 1430 may store a program and data required for an operation of the BS. Furthermore, the memory 1430 may store control information or data included in a signal obtained by the network entity. The memory 1430 may include a storage medium such as a read only memory (ROM), a random access memory (RAM), a hard disk, a compact disc ROM (CD-ROM), and a digital versatile disk (DVD), or a combination of storage mediums. Moreover, the memory 1430 may be in the plural.

Figure 15:
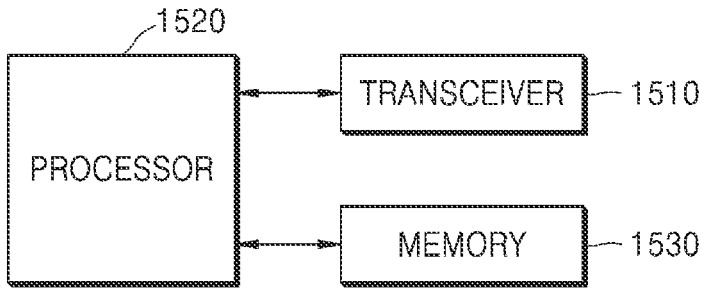
FIG. 15 is a block diagram of a UE, according to an embodiment of the disclosure.

FIG. 15 is a block diagram of a UE, according to an embodiment of the disclosure.

Referring to FIG. 15, the UE may include a transceiver 1510, a processor 1520, and a memory 1530. In the disclosure, the processor 1520 may be a circuit or an ASIC, and may include at least one processor. Various embodiments of the disclosure are not limited to the illustration of FIG. 15, and the UE may include more or fewer components than the components of FIG. 15. In addition, the transceiver 1510, the processor 1530, and the memory 1520 may be implemented in a single chip.

The transceiver 1510 may transmit or receive signals to or from another network entity. The transceiver 1510 may, for example, receive system information from a BS and receive a sync signal or a reference signal. The signals to be transmitted to or received from the BS or the network entity may include control information and data. For this, the transceiver 1510 may include an RF transmitter for up-converting the frequency of a signal to be transmitted and amplifying the signal and an RF receiver for low-noise amplifying a received signal and down-converting the frequency of the received signal. It is merely an example of the transceiver 1510, and the elements of the transceiver 1510 are not limited to the RF transmitter and RF receiver. In addition, the transceiver 1510 may receive a signal on a wireless channel and output the signal to the processor 1520, or transmit a signal output from the processor 1520 on a wireless channel.

The processor 1520 may control general operation of the UE according to the embodiment of the disclosure. For example, the processor 1520 may control signal flows between the respective blocks to perform the operation of the UE as described above with reference to FIGS. 1 to 13.

The memory 1530 may store at least one of information received or for transmission by the transceiver 1510 and information generated by the processor 1520. The memory 1530 may store a program and data required for operation of the UE. Furthermore, the memory 1530 may store control information or data included in a signal obtained by the UE. The memory 1530 may include a storage medium such as a ROM, a RAM, a hard disk, a CD-ROM, and a DVD, or a combination of storage mediums. Moreover, the memory 1530 may be in the plural.

Figure 16:
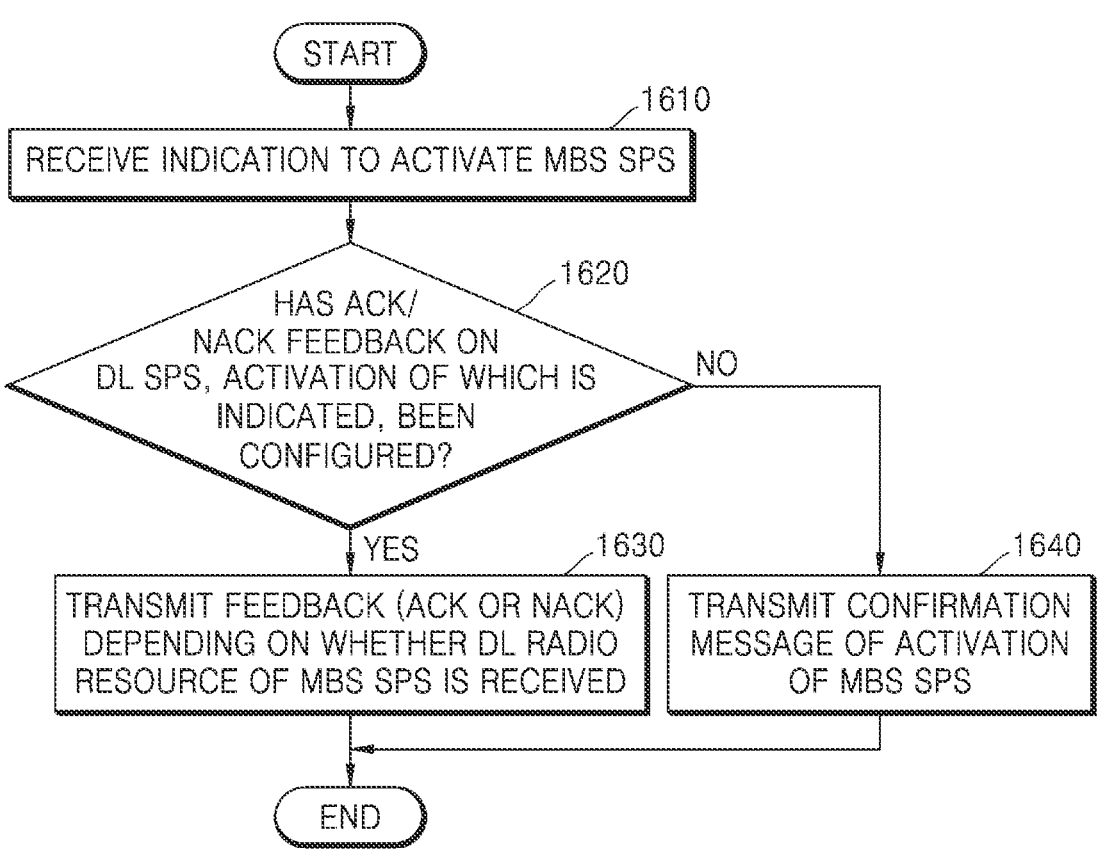
FIG. 16 illustrates operations of a BS and a UE when MBS SPS is activated, according to an embodiment of the disclosure.

FIG. 16 illustrates operations of a BS and a UE when MBS SPS is activated, according to an embodiment of the disclosure.

In operation 1610, MBS SPS may be configured and activated. In the embodiment of FIG. 16, as described above in connection with operations 430, 500, 600 and 750, activation of MBS SPS may be indicated by the BS to the UE. The activation of MBS SPS may be indicated by using a PDCCH resource with a G-CS-RNTI, in which case a new data indicator (NDI) value may be set to 0 to indicate MBS SPS activation.

When the MBS SPS is already being transmitted to other UEs and a UE needs to receive in the middle of the MBS SPS, activation of the MBS SPS may be indicated using a PDCCH resource not by a G-CS-RNTI but by a CS-RNTI that may be used for one UE. When the MBS SPS is activated, MAC layer entities of the UE and the BS may store MBS SPS allocation information and HARQ information associated with the MBS SPS allocation information. The HARQ information may correspond to at least one of an HARQ process, MCS related information or a TB size. The MAC layer entity may initialize or reinitialize the resource configured for the MBS SPS. When an MBS SPS resource is activated from an inactive state, it may correspond to initialization, and when an already active MBS SPS resource is reactivated, it may correspond to reinitialization.

The BS may indicate activation of the MBS SPS to the UE, but when the UE fails to decode the PDCCH and is thus unable to activate (or reactivate) the MBS SPS, the BS needs to indicate activation of the MBS SPS again or change the configuration. However, when there is no feedback (response) from the UE or information in the feedback is limited, the BS hardly knows of whether the UE has actually applied activation of the MBS SPS. To prevent this, an operation of notifying the BS that the UE has applied activation of the MBS SPS may be performed. However, when the UE is configured to provide feedback for reception of the MBS SPS and the UE sends the feedback, the BS may know of the activation of the MBS SPS in the UE.

When the MBS SPS is activated, the MAC layer entity of the UE may determine whether ACK/NACK feedback for the DL MBS SPS, activation of which is indicated, is configured, in operation 1620. The ACK/NACK feedback represents feedback of whether the UE has successfully received every allocated MBS SPS resource (ACK) or has failed to receive it (NACK). This feedback generally refers to feedback transmitted through a PUCCH physical channel.

When the ACK/NACK feedback for the MBS SPS is configured, the UE may try to receive the DL MBS SPS resource, activation of which is indicated, transmit ACK in the case of successful reception and transmit NACK in the case of failure of reception, depending on whether the reception is successful, in operation 1630. The UE may use a UCI format of the PUCCH physical channel to transmit the ACK/NACK feedback. When the BS successfully receives the ACK/NACK feedback, the BS may know that the UE has applied activation of the MBS SPS.

When the ACK/NACK feedback for the MBS SPS is not configured, it may mean that the UE is configured with NACK-only feedback that transmits NACK only when the MBS SPS resource has not been successfully received or that the UE is configured not to transmit feedback of the MBS SPS.

In this case, the UE receives an MBS SPS activation message and needs to notify application of this to the BS, in operation 1640. In operation 1640, the UE may transmit a confirmation message of the MBS SPS activation. The MBS SPS activation confirmation message may be transmitted in the form of an MAC CE. In another embodiment, the MBS SPS activation confirmation message may have a UCI format of a PUCCH. In another embodiment, the MBS SPS activation confirmation message may have the form of an RRC message.

When the MBS SPS activation is also indicated in the MBS SPS configuration message as shown in FIG. 6, the UE may not transmit the MBS SPS activation confirmation message. The MBS SPS activation confirmation message may include an identity of the MBS SPS to distinguish which MBS SPS it is to confirm the activation. Alternatively, the MBS SPS activation confirmation message may include a field corresponding to the MBS SPS configuration, and indicate whether the UE has received (or applied) the MBS SPS activation message. When receiving the MBS SPS activation confirmation message from the UE, the BS may recognize that the MBS SPS has been successfully activated for the UE. Otherwise, when the BS fails to receive the MBS SPS activation confirmation message, the BS may recognize that the UE has not activated the MBS SPS and retransmit the MBS SPS activation message.

Figure 17:
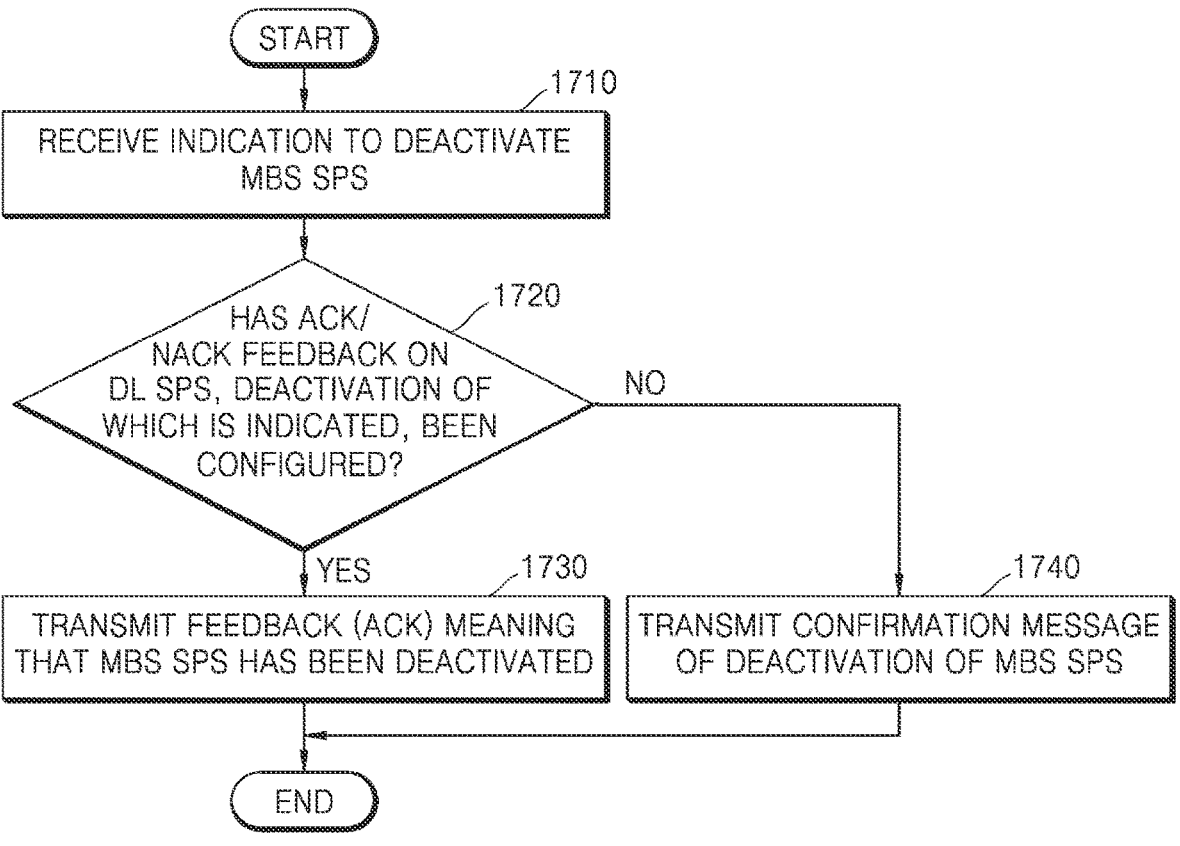
FIG. 17 illustrates operations of a BS and a UE when MBS SPS is deactivated, according to an embodiment of the disclosure.

FIG. 17 illustrates operations of a BS and a UE when MBS SPS is deactivated, according to an embodiment of the disclosure.

In operation 1710, MBS SPS may be deactivated. In the embodiment of FIG. 17, as described above in connection with operations 440, 640, 770, etc., deactivation of the MBS SPS may be indicated by the BS to the UE. The deactivation of the MBS SPS may be indicated using a PDCCH resource with a G-CS-RNTI, in which case an NDI value may be set to 0 to indicate MBS SPS deactivation. When the MBS SPS is being transmitted to multiple UEs and the BS wants to deactivate reception of the MBS SPS for a particular UE, deactivation of the MBS SPS may be indicated using a PDCCH resource not by a G-CS-RNTI but by a CS-RNTI that is available for one UE. When the MBS SPS is deactivated, MAC layer entities of the UE and the BS may clear MBS SPS allocation information and associated HARQ information. The HARQ information may correspond to at least one of an HARQ process, MCS related information or a TB size.

The BS may indicate deactivation of the MBS SPS to the UE, but when the UE fails to decode the PDCCH and is thus unable to deactivate the MBS SPS, the BS needs to indicate deactivation of the MBS SPS again or change the configuration. However, when there is no feedback (response) from the UE or information in the feedback is limited, the BS hardly knows of whether the UE has actually applied deactivation of the MBS SPS. To prevent this, an operation of notifying the BS that the UE has applied deactivation of the MBS SPS may be performed. However, when the UE is configured to provide feedback for reception of the MBS SPS and the UE sends the feedback, the BS may know of the deactivation of the MBS SPS in the UE.

When the MBS SPS is deactivated, the MAC layer entity of the UE may determine whether ACK/NACK feedback for the DL MBS SPS, deactivation of which is indicated, is configured, in operation 1720. The ACK/NACK feedback represents feedback of whether the UE has successfully received every allocated MBS SPS resource (ACK) or has failed to receive it (NACK). This feedback generally refers to feedback transmitted through a PUCCH physical channel.

When the ACK/NACK feedback for the MBS SPS is configured, the UE may transmit, to the BS, an ACK message which is feedback meaning that the MBS SPS has been deactivated, in operation 1730. The ACK message may use an ACK/NACK feedback format of the MBS SPS, and the UE may transmit the ACK message in the UCI format of the PUCCH physical channel. When the BS successfully receives the ACK feedback, the BS may know that the UE has applied deactivation of the MBS SPS.

When the ACK/NACK feedback for the MBS SPS is not configured, it may mean that the UE is configured with NACK-only feedback that transmits NACK only when the MBS SPS resource has not been successfully received or that the UE is configured not to transmit feedback of the MBS SPS.

In this case, in operation 1740, the UE may transmit a confirmation message of the MBS SPS deactivation. The MBS SPS deactivation confirmation message may be transmitted in the form of MAC CE. In another embodiment, the MBS SPS deactivation confirmation message may have a UCI format of a PUCCH. In another embodiment, the MBS SPS deactivation confirmation message may have the form of an RRC message. The MBS SPS deactivation confirmation message may include an identity of MBS SPS to distinguish which MBS SPS it is to confirm the deactivation. Alternatively, the MBS SPS deactivation confirmation message may include a field corresponding to the MBS SPS configuration, and indicate whether the UE has received (or applied) the MBS SPS deactivation message.

When receiving the MBS SPS deactivation confirmation message from the UE, the BS may recognize that the UE has successfully deactivated the MBS SPS. Otherwise, when the BS fails to receive the MBS SPS deactivation confirmation message, the BS may recognize that the UE has not deactivated the MBS SPS and retransmit the MBS SPS deactivation message.

In an embodiment, a UE in an idle mode or inactive mode may receive MBS SPS data after configuring and activating the MBS SPS. When the UE receives an indication to deactivate the MBS SPS from the BS while receiving the MBS SPS data, the UE may be switched into a connected mode. The UE may be switched into the connected mode, and may transmit, to the BS, a confirmation message indicating that the UE has received and applied the MBS SPS deactivation message. However, in an embodiment, only when the UE in the idle mode or inactive mode no longer receives an MBS service of interest due to the MBS SPS deactivation, the UE may be switched into the connected mode and send information of the MBS service of interest to the BS. The BS may then provide the MBS service again for the UE.

In the embodiment of FIG. 17, the confirmation message indicating deactivation of the MBS SPS may use the same format as the confirmation message indicating activation of the MBS SPS as described in FIG. 16. In some embodiment, a message format indicating that the UE has applied activation or deactivation of the MBS SPS (received indication of activation/deactivation of the MBS SPS) may be used regardless of activation or deactivation of the MBS SPS. In this case, the confirmation message may have the form of a 0 byte MAC CE to minimize the size of the message, and transmitting the 0 byte MAC CE may mean that the activation or deactivation indicated has been applied.

Figure 18:
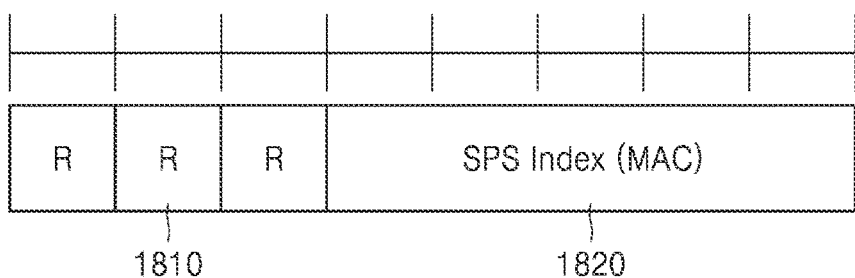
FIG. 18 illustrates a format of an MBS SPS activation or deactivation confirmation message, according to an embodiment of the disclosure.

FIG. 18 illustrates a format of an MBS SPS activation or deactivation confirmation message, according to an embodiment of the disclosure.

In the embodiment of FIG. 18, transmission of an MBS SPS activation or deactivation confirmation message is represented in the MAC CE form. The MBS SPS activation or deactivation confirmation message may include reserved (R) fields 1810 to pad a byte (8 bits) and an SPS index field

1820. When the UE sends the MBS SPS activation or deactivation confirmation message to the BS, the message may be transmitted to the BS with the reservation fields set to have a preset value 0 or 1 and the SPS index field set to an identity identifying MBS SPS, activation or deactivation of which is applied. In the embodiment of FIG. 18, the identity of the MBS SPS may use an SPS index value set in the MAC device. When activation or deactivation of MBS SPS having an index value of 1 in the MAC device of the MBS SPS is indicated, an MBS SPS confirmation message of FIG. 18 is transmitted to the BS with the SPS index value set to 1. On receiving this message, the BS may recognize that the UE has applied activation or deactivation of MBS SPS having an SPS index value of 1.

Figure 19:
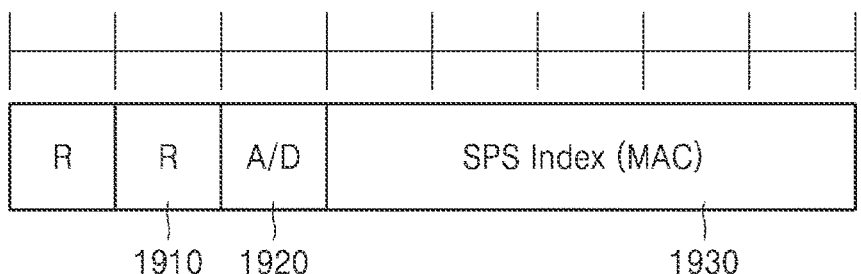
FIG. 19 illustrates a format of an MBS SPS activation or deactivation confirmation message, according to an embodiment of the disclosure.

FIG. 19 illustrates a format of an MBS SPS activation or deactivation confirmation message, according to an embodiment of the disclosure.

In the embodiment of FIG. 19, transmission of an MBS SPS activation or deactivation confirmation message is represented in the MAC CE form. The MBS SPS activation or deactivation confirmation message may include reserved (R) fields 1910 to pad a byte (8 bits), an A/D field 1920, and an SPS index field 1930. When the UE sends the MBS SPS activation or deactivation confirmation message to the BS, this message may be transmitted to the BS with the reservation fields set to have a preset value of 0 or 1 and the A/D field set to have a bit corresponding to activation A when the UE has applied activation of the MBS SPS and have a bit corresponding to deactivation D when the UE has applied deactivation of the MBS SPS. The SPS index field may be set to an identity identifying an MBS SPS, activation or deactivation of which has been applied. In the embodiment of FIG. 19, the identity of the MBS SPS may use an SPS index value set in the MAC device. When activation or deactivation of MBS SPS having an index value of 1 in the MAC device of the MBS SPS is indicated, an MBS SPS confirmation message of FIG. 19 is transmitted to the BS with the SPS index value set to 1. On receiving this message, the BS may recognize that the UE has applied activation or deactivation of MBS SPS having an SPS index value of 1.

Figure 20:
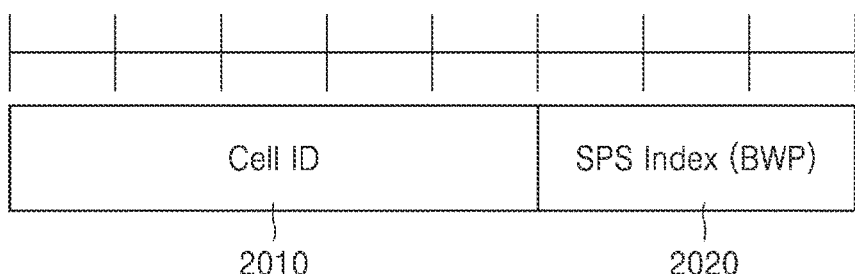
FIG. 20 illustrates a format of an MBS SPS activation or deactivation confirmation message, according to an embodiment of the disclosure.

FIG. 20 illustrates a format of an MBS SPS activation or deactivation confirmation message, according to an embodiment of the disclosure.

In the embodiment of FIG. 20, transmission of an MBS SPS activation or deactivation confirmation message is represented in the MAC CE form. The MBS SPS activation or deactivation confirmation message may include a cell ID field 2010 and an SPS index field 2020. When the UE sends the MBS SPS activation or deactivation confirmation message to the BS, the cell ID field may be set to a cell ID (cell index) of the MBS SPS for which the UE has applied activation or deactivation, and the SPS index field may be set to an identity identifying MBS SPS, activation or deactivation of which has been applied. In an embodiment of FIG. 20, the identity of the MBS SPS may use an SPS index value set in a BWP and may be combined with a cell ID to indicate an MBS SPS configured in an active BWP of a cell. For example, when activation or deactivation of MBS SPS having an index value of 1 in a BWP of the MBS SPS is indicated, an MBS SPS confirmation message of FIG. 20 may be transmitted to the BS with the SPS index value set to 1. On receiving this message, in combination with the cell ID, the BS may recognize that the UE has applied activation or deactivation of MBS SPS having an SPS index value of 1 in the active BWP of the indicated cell ID.

Figure 21:
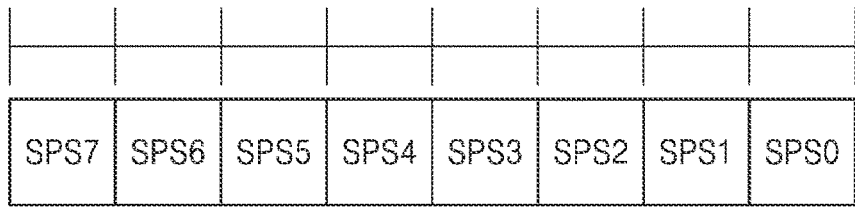
FIG. 21 illustrates a format of an MBS SPS activation or deactivation confirmation message, according to an embodiment of the disclosure.

FIG. 21 illustrates a format of an MBS SPS activation or deactivation confirmation message, according to an embodiment of the disclosure.

In the embodiment of FIG. 21, transmission of an MBS SPS activation or deactivation confirmation message is represented in the MAC CE form. This MBS SPS activation or deactivation confirmation message may have a SPSi (i is an integer equal to or greater than 0) that may correspond to each MBS SPS. In this case, i of the SPSi may be an SPS index value, and the SPS index may be an SPS index set in the MAC device. To transmit the MBS SPS confirmation message after receiving an indication to activate or deactivate particular MBS SPS, the UE may transmit the message with a SPSi field value corresponding to the MBS SPS applied by indicating activation or deactivation of the MBS SPS set to 1 when using the format of FIG. 21. The UE may set 0 for a SPSi field for MBS SPS that is not applied because activation or deactivation of the MBS SPS is not indicated. With this, the BS recognizes what MBS SPS has been activated or deactivated.

Methods according to the claims of the disclosure or the embodiments described in the specification may be implemented in hardware, software, or a combination of hardware and software.

When implemented in software, a computer-readable storage medium storing one or more programs (software modules) may be provided. The one or more programs stored in the computer-readable storage medium are configured for execution by one or more processors in an electronic device. The one or more programs may include instructions that cause the electronic device to perform the methods in accordance with the claims of the disclosure or the embodiments described in the specification.

The programs (software modules, software) may be stored in a random access memory (RAM), a non-volatile memory including a flash memory, a read only memory (ROM), an electrically erasable programmable ROM (EE-PROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. Each of the memories may be provided in the plural.

The program may also be stored in an attachable storage device that may be accessed over a communication network including the Internet, an intranet, a local area network (LAN), a wide LAN (WLAN), or a storage area network (SAN), or a combination thereof. The storage device may be connected to an apparatus for performing the embodiments of the disclosure through an external port. Furthermore, an extra storage device in the communication network may access a device that performs the embodiments of the disclosure.

In the embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

Several embodiments have thus far been described, but it will be understood that various modifications can be made without departing from the scope of the disclosure. Thus, it will be apparent to those of ordinary skill in the art that the disclosure is not limited to the embodiments described, but can encompass not only the appended claims but their equivalents. For example, an embodiment of the disclosure and some of another embodiment of the disclosure may be combined to operate the BS and the UE. The embodiments of the disclosure may be equally applied to other communication systems, and other modifications of the embodiments may also be made without departing from the scope of the disclosure.

The invention claimed is:

1. A method by which a user equipment (UE) operates in a wireless communication system, the method comprising:
   receiving, from a base station (BS), radio resource control (RRC) message associated with multicast and broadcast service (MBS) semi-persistent scheduling (SPS) configuration information:
   receiving, from the BS, first downlink control information (DCI) for an activation of MBS SPS based on a group-configured scheduling-transmission radio network temporary identifier (G-CS-RNTI):
   receiving, from the BS, an MBS data based on the MBS SPS configuration information and the first DCI for the activation of MBS SPS;
   in response to a failure to receive the MBS data, receiving, from the BS, second DCI for a retransmission resource of the MBS data based on the G-CS-RNTI,
   receiving, from the BS, the MBS data on the retransmission resource based on the second DCI;
   receiving, from the BS, third DCI for a deactivation of MBS SPS based on the G-CS-RNTI; and
   based on the third DCI for the deactivation of MBS SPS, discarding the MBS SPS configuration information.

2. The method of claim 1, wherein the MBS SPS configuration information includes information on a periodicity of MBS SPS.

3. A user equipment (UE) operating in a wireless communication system, the UE comprising:
   a transceiver; and
   at least one processor configured to:
      receive, from a base station (BS) via the transceiver, radio resource control (RRC) message associated with multicast and broadcast service (MBS) semi-persistent scheduling (SPS) configuration information,
      receive, from the BS via the transceiver, first downlink control information (DCI) for an activation of MBS SPS based on a group-configured scheduling-transmission radio network temporary identifier (G-CS-RNTI),
      receive, from the BS via the transceiver, an MBS data based on the MBS SPS configuration information and the first DCI for the activation of MBS SPS,
      in response to a failure to receive the MBS data, receive, from the BS via the transceiver, second DCI for a retransmission resource of the MBS data based on the G-CS-RNTI,
      receive, from the BS via the transceiver, the MBS data on the retransmission resource based on the second DCI,
      receive, from the BS via the transceiver, third DCI for a deactivation of MBS SPS based on the G-CS-RNTI, and
      based on the third DCI for the deactivation of MBS SPS, discarding the MBS SPS configuration information.

4. The UE of claim 3, wherein the MBS SPS configuration information includes information on a periodicity of MBS SPS.

5. A base station (BS) operating in a wireless communication system, the BS comprising:

a transceiver; and at least one processor configured to:

transmit, to a user equipment (UE) via the transceiver, radio resource control (RRC) message associated with multicast and broadcast service (MBS) semi-persistent scheduling (SPS) configuration information, transmit, to the UE via the transceiver, first downlink control information (DCI) for an activation of MBS SPS based on a group-configured scheduling-transmission radio network temporary identifier (G-CS-RNTI), transmit, to the UE via the transceiver, an MBS data according to the MBS SPS configuration information and the first DCI for the activation of MBS SPS, transmit, to the UE via the transceiver, second DCI for a retransmission resource of the MBS data based on the G-CS-RNTI, transmit, to the UE via the transceiver, the MBS data on the retransmission resource according to the second DCI, and transmit, to the UE via the transceiver, third DCI for a deactivation of MBS SPS based on the G-CS-RNTI, wherein, in response to the third DCI for the deactivation of MBS SPS, the MBS SPS configuration information is discarded.

6. A method by which a base station, BS, operates in a wireless communication system, the method comprising:

transmitting, to a user equipment (UE), radio resource control (RRC) message associated with multicast and broadcast service (MBS) semi-persistent scheduling (SPS) configuration information:

transmitting, to the UE, first downlink control information (DCI) for an activation of MBS SPS based on a group-configured scheduling-transmission radio network temporary identifier (G-CS-RNTI);

transmitting, to the UE, an MBS data according to the MBS SPS configuration information and the first DCI for the activation of MBS SPS;

transmitting, to the UE, second DCI for a retransmission resource of the MBS data based on the G-CS-RNTI;

transmitting, to the UE, the MBS data on the retransmission resource according to the second DCI; and transmitting, to the UE, third DCI for a deactivation of MBS SPS based on the G-CS-RNTI, wherein, in response to the third DCI for the deactivation of MBS SPS, the MBS SPS configuration information is discarded.

7. The method of claim 6, wherein the MBS SPS configuration information includes information on a periodicity of MBS SPS.

* * * * *